US006285422B1

(12) United States Patent
Maeda et al.

(10) Patent No.: US 6,285,422 B1
(45) Date of Patent: *Sep. 4, 2001

(54) TRANSFLECTIVE LIQUID CRYSTAL DEVICE WITH BRIGHT REFLECTIVE DISPLAY

(75) Inventors: Tsuyoshi Maeda; Osamu Okumura, both of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/068,661

(22) PCT Filed: Sep. 12, 1997

(86) PCT No.: PCT/JP97/03252

§ 371 Date: May 14, 1998

§ 102(e) Date: May 14, 1998

(87) PCT Pub. No.: WO98/12594

PCT Pub. Date: Mar. 26, 1998

(30) Foreign Application Priority Data

Sep. 17, 1996 (JP) .................................................. 8-245346
Apr. 11, 1997 (JP) .................................................. 9-093917

(51) Int. Cl.[7] .............................................. G02F 1/1335
(52) U.S. Cl. .............................. 349/96; 349/68; 349/69; 349/62; 349/64; 349/61; 345/87
(58) Field of Search ................................ 345/87, 102, 83, 345/76, 77, 44; 349/68, 96, 71, 61–62, 69–70, 97, 101, 113, 114, 98, 86, 64–65, 104; 359/495, 497–498, 501, 483, 487; 362/84, 19

(56) References Cited

U.S. PATENT DOCUMENTS 4,315,258  2/1982  McKnight et al. .

(List continued on next page.)

FOREIGN PATENT DOCUMENTS 57-49271  9/1955 (JP) .
58-24122  2/1983 (JP) .

(List continued on next page.)

OTHER PUBLICATIONS

"Retroreflecting Sheet Polarizer," M.F. Weber, SID 92 Digest, 1992, pp. 427–429.

*Primary Examiner*—Richard Hjerpe
*Assistant Examiner*—Francis Nguyen
(74) *Attorney, Agent, or Firm*—Oliff & Berridge, PLC.

(57) ABSTRACT

A polarizer 14 is provided on the upper side of a liquid crystal panel 10, and a light scattering member 15 and a polarized light separator 16 are provided in turn on the lower side of the liquid crystal panel 10. Of light incident on the upper side of the polarized light separator 16, a linearly polarized light component parallel to the drawings is transmitted, a linearly polarized light component perpendicular to the drawings is reflected, and for light incident on the lower side thereof, a linearly polarized light component parallel to the drawings can be emitted upward. When the switch is off, the external light incident on the display device is reflected by the polarized light separator 16 to obtain a bright display, and when the switch is on, the incident external light is transmitted through the polarized light separator 16 to obtain a dark display. When the switch is off, light from a light source 17 is transmitted through the polarized light separator 16 and absorbed by the polarizer 12 to obtain dark display, and when the switch is on, the light is transmitted through the polarized light separator 16 and through the polarizer 14 to obtain a bright display.

51 Claims, 26 Drawing Sheets

U.S. PATENT DOCUMENTS

| | | | |
|---|---|---|---|
| 4,974,219 | | 11/1990 | Korth .............................. 369/110.02 |
| 5,686,979 | * | 11/1997 | Weber et al. .......................... 349/96 |
| 5,691,788 | * | 11/1997 | Kim ...................................... 349/96 |
| 5,691,790 | * | 11/1997 | Havens et al. ....................... 349/113 |
| 5,777,594 | * | 7/1998 | Miyawaki ............................ 345/102 |
| 5,815,228 | * | 9/1998 | Flynn .................................... 349/71 |
| 5,825,542 | * | 10/1998 | Cobb, Jr. et al. ................... 359/487 |
| 5,841,494 | * | 11/1998 | Hall ....................................... 349/98 |
| 6,008,871 | * | 12/1999 | Okumura .............................. 349/61 |
| 6,025,897 | * | 2/2000 | Weber et al. .......................... 349/96 |

FOREIGN PATENT DOCUMENTS

| | | |
|---|---|---|
| 2-178627 | 7/1990 | (JP) . |
| 7-36032 | 2/1995 | (JP) . |
| 7-77691 | 3/1995 | (JP) . |
| 9-506984 | 7/1997 | (JP) . |
| 9-506985 | 7/1997 | (JP) . |
| 95/17303 | 6/1995 | (WO) . |
| 95/17691 | 6/1995 | (WO) . |
| 95/17692 | 6/1995 | (WO) . |
| 95/17699 | 6/1995 | (WO) . |
| 95/27819 | 10/1995 | (WO) . |
| 95/27919 | 10/1995 | (WO) . |
| 96/19347 | 6/1996 | (WO) . |
| 97/01439 | 1/1997 | (WO) . |
| 97/01440 | 1/1997 | (WO) . |
| 97/01610 | 1/1997 | (WO) . |
| 97/01726 | 1/1997 | (WO) . |
| 97/01774 | 1/1997 | (WO) . |
| 97/01778 | 1/1997 | (WO) . |
| 97/01780 | 1/1997 | (WO) . |
| 97/01781 | 1/1997 | (WO) . |
| 97/01788 | 1/1997 | (WO) . |
| 97/01789 | 1/1997 | (WO) . |
| WO 97/01788 | 1/1997 | (WO) . |
| WO 97/01789 | 1/1997 | (WO) . |
| 97/07653 | 2/1997 | (WO) . |

* cited by examiner

TRANSFLECTIVE LIQUID CRYSTAL DEVICE WITH BRIGHT REFLECTIVE DISPLAY

BACKGROUND OF THE INVENTION

1. Field of Invention

The present invention relates to a display device, and specifically to a display device using a liquid crystal as variable transmission polarization axis means or polarizer. Particularly, the present invention relates to a so-called transflective liquid crystal display device functioning as a transmissive liquid crystal display device when a light source is turned on, and functioning as a reflective liquid crystal display device when the light source is turned off. Also the present invention relates to electronic apparatus comprising the display device as a display unit, such as a watch, an electronic handbook, a personal computer, and the like.

2. Description of Related Art

A conventional liquid crystal display device comprising a variable transmission polarization axis optical element 2605 in which the polarization axis of a liquid crystal is variable, such as a TN (Twisted Nematic) liquid crystal, STN (Super-Twisted Nematic) crystal, or the like, has a structure in which the variable transmission polarization axis optical element 2605 is sandwiched between two polarizers 2601 and 2606, as shown in FIG. 26. Therefore, the conventional liquid crystal display device has a low efficiency of light utilization, and particularly, a reflective type has a problem with dark display.

SUMMARY OF THE INVENTION

Accordingly, an object of the present invention is to provide a display device using a polarization changing element with a display device which is capable of obtaining a bright display.

Also, in a conventional transflective reflective liquid crystal display device, an Al reflecting plate is formed thin, or an opening is provided, thereby decreasing a reflectance at the reflective display. Namely, in a transflective type, brightness at the reflective display is sacrificed.

Accordingly, another object of the present invention is to provide a transflective and bright reflective liquid crystal display device with bright reflective display comprising a light source provided on the back of a reflective liquid crystal display device so as to permit not only reflective display by external light, but also display by transmitted light from the light source provided on the back.

In the transflective reflective liquid crystal display device, when external light is incident on the display device with the light source turned on, the display is sometimes hard to see due to positive-negative reversal.

Accordingly, a further object of the present invention is to provide a display device in which the display is not hard to see in case of positive-negative reversal.

In accordance with the present invention, a display device comprises a polarization changing element having a variable transmission polarization axis, first and second polarized light separators, disposed on both sides of the polarization changing element, sandwiching thereof, and a light source disposed opposite to the polarization changing element with respect to the second polarized light separator, wherein the first polarized light separator transmits light incident on a first side of the first polarized light separator that is, a linearly polarized in a first predetermined direction but does not transmit light that is linearly polarized in a second direction different from the first predetermined direction. The first polarized light separator also transmits light incident on the second side of the first polarized light separator that is linearly polarized light in the first direction but does not transmit light that is linearly polarized light in the second direction. The second polarized light separator transmits light incident on a polarization changing elements side that is linearly polarized in a third predetermined direction is transmitted to a light source side, However, light that is linearly polarized in a fourth predetermined direction different from the third predetermined direction is reflected to the polarization changing element side. As for light incident on the light source side, linearly polarized light in the third predetermined direction is emitted to the polarization changing element side.

In this display device of the present invention, for light incident from the outside of the first polarized light separator, two display states, i.e., a first display state created by the light reflected from the second polarized light separator, and a second display state where the light transmitted through the second polarized light separator is absorbed by the light source side, are obtained according to the state of the transmission polarization axis of the polarization changing element, to operate the display device as a reflective display device. The first display state is a display state created by the light reflected from the second polarized light separator and thus produces a bright display.

For light from the light source, two display states, i.e., a third display state created by the light transmitted through the first polarized light separator, and a fourth display state where no light is transmitted through the first polarized light separator, are obtained according to the state of the transmission polarization axis of the polarization changing element, to obtain a transmissive display.

The second polarized light separator is preferably polarized light separator in which for light over substantially the entire wavelength range of the visible light region, of light incident on the polarization changing element side, a linearly polarized light component in the third predetermined direction is transmitted to the light source side, and a linearly polarized light component in the fourth predetermined direction different from the third predetermined direction is reflected to the polarization changing element side. For light incident on the light source side which is light over substantially the entire wavelength range of the visible light region, linearly polarized light in the third predetermined direction is emitted to the polarization changing element side.

As a result, the first to fourth display states are obtained for light over substantially the entire wavelength range of the visible light region, and a transparent or white display can be obtained in the first and third display states.

The second polarized light separator is preferably polarized light separator in which of light incident on the polarization changing element side, a linearly polarized light component in the third predetermined direction is transmitted as linearly polarized light in the third predetermined direction to an optical element side. The second polarized light means is preferably polarized light separator comprising films laminated in a plurality of layers in which the refractive indexes of the plurality of layers are the same between each adjacent layer in the third predetermined direction, and different in the fourth predetermined direction.

The first polarized light separator preferably comprises a polarizer.

The polarization changing element preferably comprises a liquid crystal panel, particularly a TN liquid crystal panel, an STN liquid crystal panel, an F-STN liquid crystal panel or an ECB liquid crystal panel. Specifically, the STN liquid crystal panel is an STN liquid crystal panel using a color compensation optical anisotropic material, such as an F-STN (Film compensated Super-Twisted Nematic) liquid crystal panel, or an STN liquid crystal panel using the double refraction of a liquid crystal without using a color compensation optical anisotropic material.

Preferably, reflection from the surface of the light source can be suppressed by darkening the surface color of the light source. Consequently, it is possible to decrease the quantity of the light transmitted through the optical element and returned by reflection from the light source, thereby suppressing a decrease in contrast.

Preferably, an optical element is further provided between the second polarized light separator and the light source, which absorbs light from the second polarized light separator side, and transmits light from the light source to the second polarized light separator side.

By providing such an optical element, for light incident from the outside of the first polarized light separator, it is possible to obtain the two display states, which are the first display state created by the light reflected from the second polarized light separator, and the second display state where the light transmitted through the second polarized light separator is absorbed by the light source and the optical element in accordance with the state of the transmission polarization axis of the polarization changing element, and thereby a reflective display device can be obtained. In the second display state, light is absorbed by not only the light source, but also the optical element, to cause a darker display.

For light from the light source, the two display states, i.e., the third display state created by the light transmitted through the first polarized light separator, and the fourth display state where no light is transmitted through the first polarized light separator, are obtained to realize a transmissive display.

The optical element is preferably an optical element which absorbs light over substantially the entire wavelength range of the visible region, and more preferably is a black light absorber.

The optical element may have openings. By providing such openings, light from the light source can be transmitted to the second polarized light separator side through the openings.

In a reflective display where external light is incident on the display device of the present invention, the two display states, i.e., the first display state created by the light reflected from the second polarized light separator, and the second display state where light transmitted through the second polarized light separator is absorbed by the optical element, are obtained, as described above. However, since the optical element is an optical element capable of absorbing light from the second polarized light separator side and of transmitting light from the light source to the second polarized light separator side, in the second display state, depending on the structure of the optical element, light is not completely absorbed by the optical element, with some light transmitted through the optical element, reflected by the light source or the like, and again transmitted through the optical element to return to the polarization changing element side, causing a decrease in contrast.

Therefore, where the optical element has a plurality of openings, preferably, the quantity of the light transmitted through the optical element and returned through the optical element can be decreased by limiting the ratio of the openings to the optical element, thereby suppressing a decrease in contrast. The area ratio of the openings to the optical element is preferably 5 to 30%.

Preferably, the quantity of light transmitted through the optical element and returned by reflection by the light source can also be decreased by setting the distance between the optical element and the light source to be larger than the diameter of the openings, thereby suppressing a decrease in contrast.

The optical element may comprise a light absorber in a gray translucent state so as to permit absorption of light from the second polarized light separator side, and transmission of light from the light source to the second polarized light separator side. In this case, the light absorber in a gray translucent state preferably has a transmittance of 10 to 80% to the light over substantially the entire wavelength range of the visible light region. The transmittance is more preferably 10 to 30%.

The optical element preferably comprises a polarizer wherein the transmission axis thereof is deviated from that of the second polarized light separator. This enables absorption of light from the polarization changing element side and transmission of light from the light source to the polarization changing element side.

The optical element preferably comprises a light scattering member capable of changing the polarization state of light incident on the optical element and of emitting light therefrom. By providing such an optical element, for light incident from the outside of the first polarized light separator, the two display states, i.e., the first display state created by the light reflected by the second polarized light separator, and the second display state where light transmitted through the second polarized light separator cannot be transmitted through a polarized light separator due to removal of the polarization state by a scattering plate, are obtained according to the state of the transmission polarization axis of the polarization changing element, and therefore a reflective display device can be formed. In the second display state, light is not only absorbed by the light source, but also scattered by the optical element to obtain a darker display.

For light from the light source, the two display states, i.e., the third display state created by the light transmitted through the first polarized light separator, and the fourth display state where no light is transmitted through the first polarized light separator, are obtained in accordance with the state of the transmission polarization axis of the polarization changing element, to obtain a transmissive display.

Preferably, means for converging light from the light source to the front of the display device is further provided.

When viewing the reflective display obtained by external light, the display is generally viewed at a position at an angle with the normal to the front of the display device. This is because if the display is viewed from the direction normal to the front of the display device, external light incident on the display device is hindered by the observer, and thus the reflective display becomes dark. On the other hand, when viewing the display obtained by transmitted light from the light source, the display is generally viewed from the direction normal to the front of the display device, and thus the display obtained by transmitted light from the light source can be bright by providing means for converging light from the light source to the front of the display device. As a result, a transmissive display obtained by the light from the light source can easily be viewed in the direction normal to the front of the display device.

Preferably, light diffusion means is further provided. This can bring about a white display in the first display state by reflection of external light from the second polarized light separator and in the third display state by transmission of light from the light source through the first polarized light separator.

The light source may comprise a cold cathode tube capable of emitting white light, and a light guide plate capable of emitting white light incident from the cold cathode tube to the second polarized light separator side. In the use of white light, for light from the light source, the two display states, which are the third display state created by the light transmitted through the first polarized light separator, and the fourth display state where no light is transmitted through the first polarized light separator, can be obtained to form a transmissive display, as described above. However, for example, a white display is obtained in the third display state when the state of the transmission polarization axis of the polarization changing element is on, and a black display is obtained in the fourth display state when the state of the transmission polarization axis of the polarization changing element is off, in accordance with the structure of the display device. In this case, when external light is incident on the first polarized light separator side of the display device, the external light produces a black display in the second display state with the transmission polarization axis of the polarization changing element turned on, and produces a white display in the first display state with the transmission polarization axis of the polarization changing element turned off.

As a result, in both the on and off states, for example, when the display obtained by transmitted light from the light source is a white display, a gray display is obtained due to addition of a reflective black display by external light, and when the display obtained by transmitted light from the light source is a black display, gray is also obtained due to addition of a reflective white display by external light, thereby causing positive-negative reversal and making a display hard to see.

Therefore, an LED capable of emitting light in the predetermined wavelength region to the second polarized light separator side, or an EL element capable of emitting light in the predetermined wavelength region is preferably used for coloring light from the light source, thereby obtaining a color display on a gray background and making it easy to see a display obtained by the light from the light source.

Where an LED is used as the light source, the light source preferably comprises a first LED capable of emitting light in the first predetermined wavelength range, and a second LED capable of emitting light in the second predetermined wavelength range different from the first predetermined wavelength range. Where an EL element is used as the light source, the light source preferably comprises a first EL element capable of emitting light in the third predetermined wavelength range, and a second EL element capable of emitting light in the fourth predetermined wavelength range different from the third predetermined wavelength range. Preferably, the first and second LED or the first and second EL elements correspond to respective character display portions to obtain different display colors in the respective character display portions, thereby usefully widening the selection range of design.

Where an LED is used as the light source, the light source preferably comprises the LED capable of emitting light in the predetermined wavelength region, and a light guide plate capable of emitting light in the predetermined wavelength region to the second polarized light separator side. In this way, since, after light emitted from the LED is incident on the light guide plate, the light can be emitted to the second polarized light separator side, the arrangement position of the LED can be relatively freely determined, thereby widening the range of design and making uniform light for emitting to the second polarized light separator side.

The light guide plate preferably has a first light guide region where light in the first predetermined wavelength range is incident from the first LED and emitted to the second polarized light separator side, and a second light guide region where light in the second predetermined wavelength range is incident from the second LED and emitted to the second polarized light separator side, with light shielding means provided between the first light guide region and the second light guide region. By providing such light shielding means, mixing of the first predetermined wavelength region and the second predetermined wavelength region is prevented, and thus color purity is increased.

A colored layer capable of transmitting or reflecting light in the predetermined wavelength region, and of absorbing light at wavelengths out of the predetermined wavelength region may be provided between the light source and the second polarized light separator. This causes light from the light source to be colored and incident on the second polarized light separator, and a color display on a gray background is thus obtained, thereby making it easy to see a transmissive display with the light from the light source. In this case, since light from the light source is colored, a white light source such as a cold cathode tube may be used as the light source. Of course, the above-described LED or EL element may be used.

The colored layer preferably has a first colored region capable of reflecting or transmitting light in the first predetermined wavelength range, and a second colored region capable of transmitting or reflecting light in the second predetermined range different from the first predetermined wavelength range, and is able to absorb light at wavelengths out of the first or second predetermined wavelength range. Preferably, the first and second colored regions correspond to respective character display portions to obtain different display colors in the respective character display portions, thereby widening the range of selection of design.

More preferably, a transflective reflective plate which can transmit light from the light source to the colored layer side, reflect light which is incident on the colored layer from the second polarized light separator side and is transmitted through the colored layer, and emit the light to the colored layer side, is further provided. As the transflective reflecting plate, a mirror reflecting plate having openings provided therein can be used. In this configuration, for light incident from the outside of the first polarized light separator, the two display states, which are the first display state created by the light reflected by the second polarized light separator, and the second display state created by the light transmitted through the second polarized light separator and reflected by the colored layer, and light transmitted through the colored layer and then reflected by the reflecting plate, are obtained according to the state of the transmission polarization axis of the polarization changing element, to form a reflective display device. In the second display state, the degree of coloring is increased due to the presence of the reflecting plate.

An electronic apparatus of the present invention comprises the above display devices as a display unit.

DETAILED DESCRIPTION OF THE PREFERRED EMBODIMENTS

Embodiments of the present invention will be described below with reference to the drawings.

First Embodiment

Basic Structure

Figure 1:
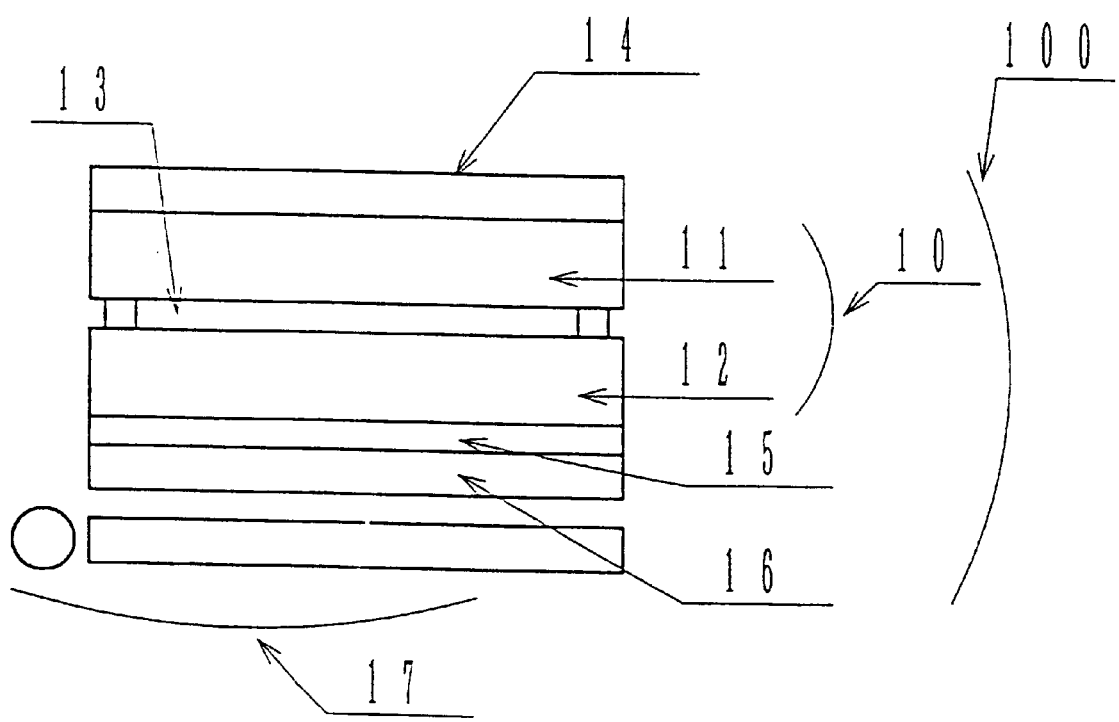
FIG. 1 is a sectional view of a display device in accordance with a first embodiment of the present invention.
Figure 2:
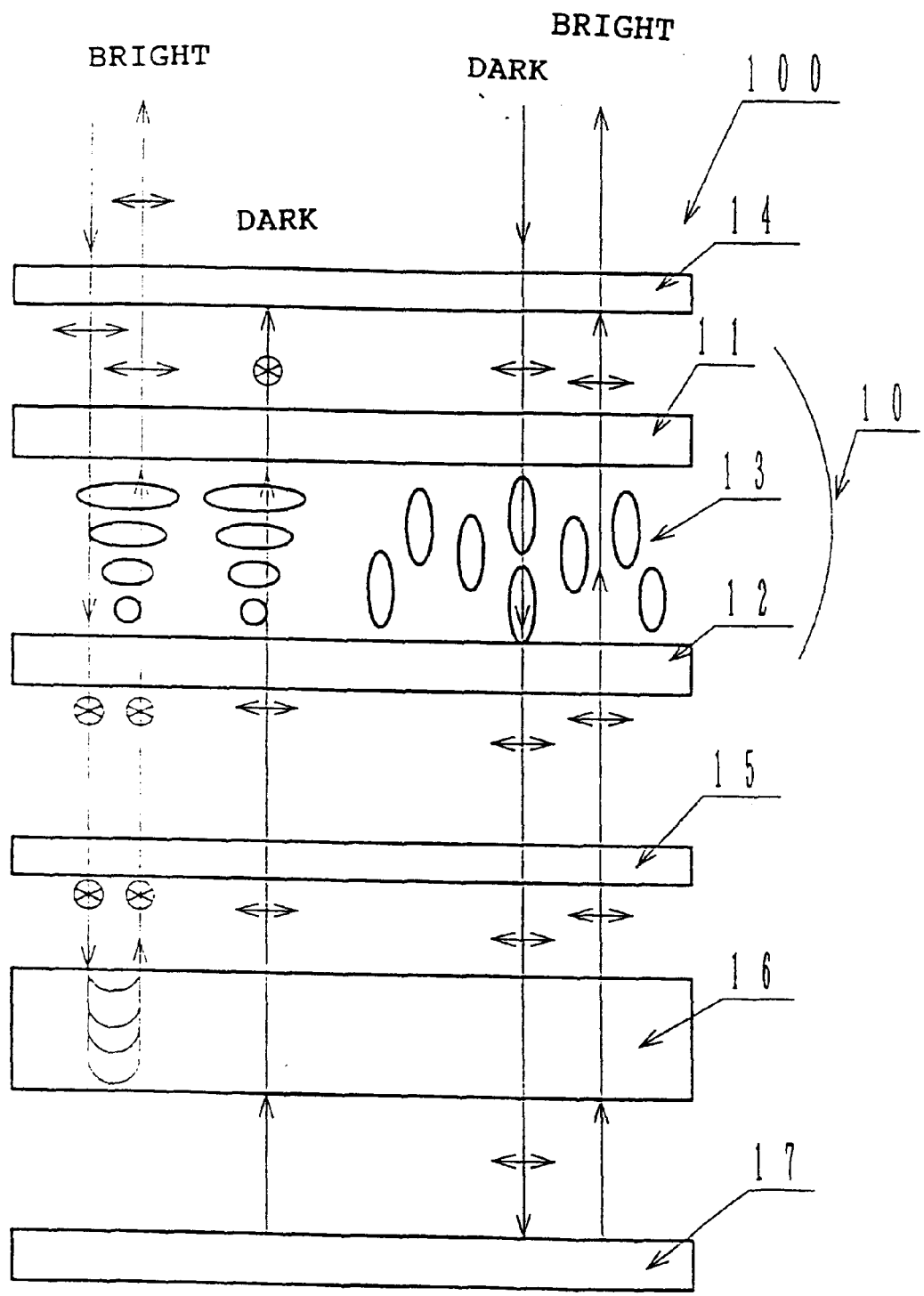
FIG. 2 is a schematic sectional view illustrating the principle of display of the display device in accordance with the first embodiment of the present invention.

FIG. 1 is a sectional view of a display device in accordance with a first embodiment of the present invention, and FIG. 2 is a schematic sectional view illustrating the principle of display of the display device in accordance with the first embodiment of the present invention.

A display 100 of this embodiment is a display device with a so-called transflective function which is capable of not only a reflective display using reflection of external light in a place where external light is present, but also a transmission display using light from a light source in a place where external light is absent.

First, the structure of the display device of this embodiment is described with reference to FIG. 1. In the display device 100, a TN liquid crystal panel 10 is used as a variable transmission polarization changing element axis optical element or polarization changing element. In the TN liquid crystal panel 10, a TN liquid crystal 13 is held between two glass plates 11 and 12, and a plurality of character display portions (not shown in the drawing) are provided to enable character display. On the upper side of the TN liquid crystal panel 10 is provided a polarizer 14. On the lower side of the TN liquid crystal panel 10 are provided a light scattering member 15, a polarized light separator 16, and a light source 17 in this order. In order to drive the TN liquid crystal 10, a TAB substrate (not shown in the drawing) provided with a driver IC is connected to the TN liquid crystal panel 10 to form the display device.

Polarized Light Separator

Next, the polarized light separator 16 used in this embodiment is described with reference to FIGS. 3 and 4. FIG. 4 is a schematic drawing showing the configuration of the polarized light separator 16 used in this embodiment, and is a drawing illustrating the operation of the polarized light separator 16 shown in FIG. 3. The polarized light separator 16 has a structure in which two layers 41 (A layer) and 42 (B layer) are alternately laminated in a plurality of layers. In the polarized light separator 16, although the refractive index ($n_{AX}$) of the A layers 41 in the X axis direction is different from the refractive index ($n_{BX}$) of the B layers 42 in the X axis direction, the refractive index ($n_{AY}$) of the A layers 41 in the Y axis direction is substantially the same as the refractive index ($n_{BY}$) of the B layers 42 in the Y axis direction. Of light incident on the polarized light separator 16, linearly polarized light in the Y axis direction is transmitted through the polarized light separator 16 because the refractive index of the A layers 41 is substantially the same as the refractive index of the B layers 42 in the polarized light separator 16. On the other hand, in the polarized light separator 16, if the thickness of the A layers 42 in the Z axis direction is $t_A$, and the thickness of the B layers 41 is $t_B$, the following equation is satisfied:

$$t_A \cdot n_{AX} + t_B \cdot n_{BX} = \lambda/2 \quad (1)$$

so that of light incident at wavelength λ on the polarized light separator 16, linearly polarized light in the X axis direction is reflected by the polarized light separator 16. Since the thickness of the A layers 41 and the thickness of the B layers 42 in the Z axis direction varies, of light incident on the polarized light separator 16 over a wide range of the visible wavelength spectrum, the polarized light separator 16 reflects linearly polarized light in the X axis direction.

In the polarized light separator 16, oriented polyethylene naphthalate (PET; polyethylene naphthalate) is used for the A layers 41, and copolyester of naphthalene dicarboxylic acid and terephthalic acid (coOEN; copolyester of naphthalene dicarboxylic acid and terephthalic or isothalic acid) can be used for the B layers 42.

Of course, materials of the polarized light separator 16 used in the present invention are not limited to these materials, and materials can be appropriately selected. Such a polarized light separator is disclosed in detail as a reflective polarizer in Unexamined International Application (International Application No. WO/95/27819 and WO95/17692).

Although, in this embodiment, the above polarized light separator 16 is used, besides the polarized light separator 16 a separator comprising a cholesteric liquid crystal layer held between λ/4 plates, a separator using the angle of polarization (SID 92DIGEST pp. 427–429), a separator using a hologram, and the like have the same function as the above polarized light separator 16, and may be used for the display device of this embodiment.

Principle of Display

On the assumption that the right half of the display device 100 is a voltage applied portion, and the left half thereof is a voltage unapplied portion, the principle of display with the display device 100 is described below with reference to FIG. 2.

First, a reflective display where external light is incident on the display device 100 is described.

In the voltage unapplied portion on the left hand side, when external light is incident on the display device 100, the external light is changed to linearly polarized light parallel to the drawing by the polarizer 14, and then the direction of polarization is rotated 90° by the TN liquid crystal 13 to form linearly polarized light perpendicular to the drawing. The linearly polarized light perpendicular to the drawing is reflected by the polarized light separator 16, and then the direction of polarization is rotated 90° by the TN liquid crystal 13 to form linearly polarized light parallel to the drawing, which is emitted as linearly polarized light parallel to the drawing from the polarizer 14. With no voltage applied, incident external light is reflected by the polarized light separator 16, not absorbed thereby, to obtain a bright reflective display. Since the light scattering member 15 is provided between the polarized light separator 16 and the TN liquid crystal panel 10, light reflected from the polarized light separator 16 is changed from a mirror state to a white state.

In the voltage applied portion on the right hand side, when external light is incident on the display device 100, the external light is changed to linearly polarized light parallel to the drawing, and then transmitted through the TN liquid crystal 13 without changing the direction of polarization, and transmitted through the polarized light separator 16 without changing the direction of polarization to reach the light source 17. Since most of the light which reaches the light source 17 is transmitted through the light source 17 or absorbed thereby, the display becomes dark.

In this way, in reflective display where external light is incident on the display device 100, in the voltage unapplied portion, light reflected by the polarized light separator 16 is transmitted through the light scattering member 15 to make the display bright, and in the voltage applied portion, light transmitted through the polarized light separator 16 is mostly transmitted through or absorbed by the light source 17 to make the display dark.

With no voltage applied, since external light incident on the display device 100 is reflected by the polarized separator 16, not absorbed thereby, a bright display is obtained.

Next, a transmissive display with the light from the light source 17 is described.

In the voltage unapplied portion on the left hand side, light from the light source 17 is incident on the polarized light separator 16, and changed to linearly polarized light parallel to the drawing by the polarized light separator 16. Then the direction of polarization is rotated 90° by the TN liquid crystal 13 to form linearly polarized light perpendicular to the drawing, which is absorbed by the polarizer 14, to make the display dark.

In the voltage applied portion on the right hand side, light from the light source 17 is incident on the polarized light separator 16, scattered by the light scattering member 15, then transmitted through the TN liquid crystal 13 without changing the direction of polarization, and also transmitted through the polarizer 14, to make the display bright.

In this way, in a transmissive display with the light from the light source 17, in the voltage unapplied portion, light from the light source 17 is absorbed by the polarizer 14 to make the display dark. In the voltage applied portion, light from the light source 17 is transmitted through the polarizer 14 to make the display bright.

Therefore, the display device 100 of this embodiment is a reflective display device with a so-called transflective function, which is capable of not only a reflective display using reflection of external light at a place with external light, but also transmissive display using light from the light source 17 at a place without external light.

Light Scattering Member 15

A light scattering member 15 capable of emitting incident light with minimal change in the state of polarization is used in the display device of this embodiment. Since this light scattering member 15 has the function to scatter and cloud the light emitted from the light scattering member, a display device with a cloudy display (white display) is obtained. In contrast, removal of the light scattering member 15 from the configuration produces a display device with a glossy display. Therefore, the light scattering member 15 may be selected in accordance with application of the display device.

Light Source

FIGS. 5 to 9 respectively show display devices using various light sources in accordance with this embodiment of the present invention. In this embodiment, any one of the light sources shown in FIGS. 5 to 8 can be used.

Figure 5:
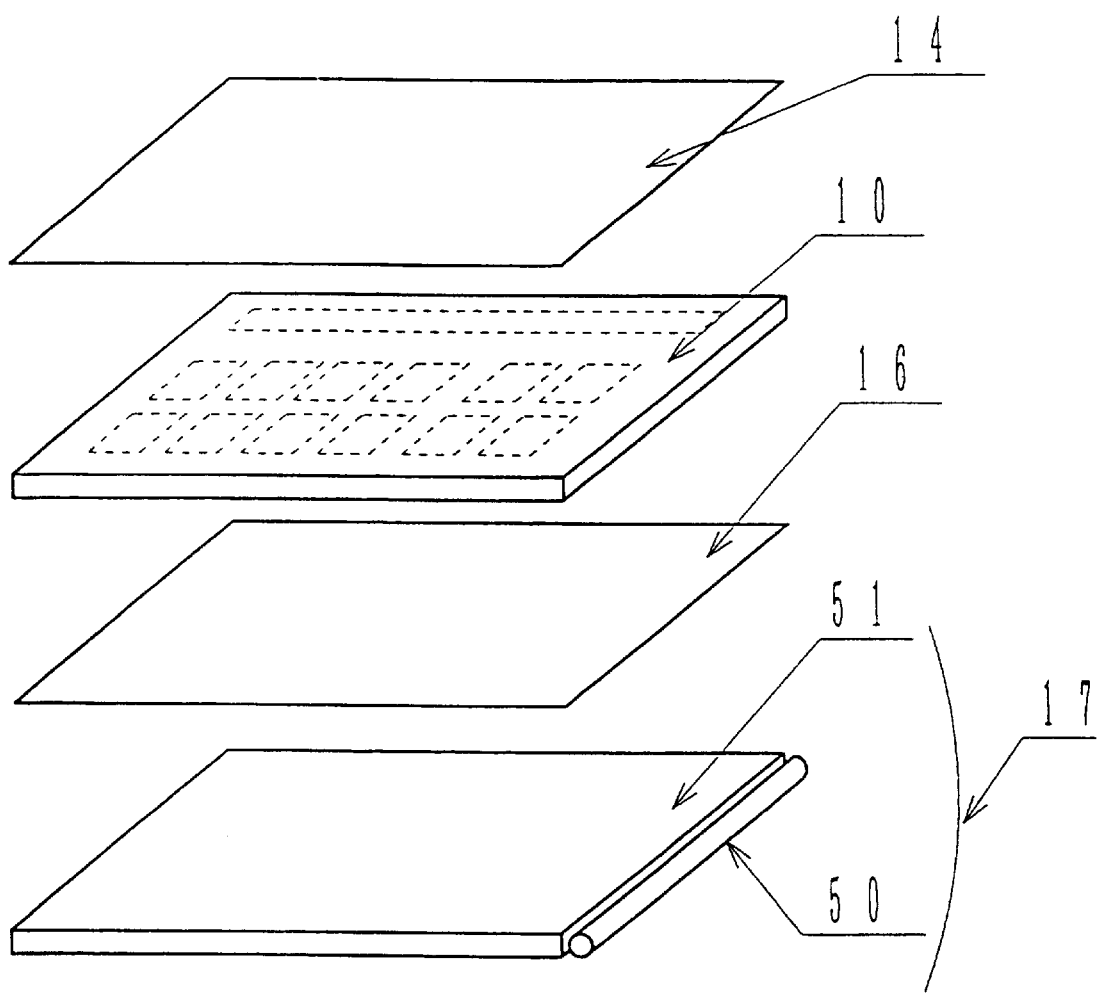
FIG. 5 is a drawing illustrating an example of a light source used in the present invention.

The light source 17 used in the display device shown in FIG. 5 comprises a cold cathode tube 50 as a light source and a light guide plate 51. As the light guide plate 51, a light guide plate having the function to absorb light when the cold cathode tube 50 is turned off is used. Where the light source 17 shown in FIG. 5 is used for the display device of this embodiment, a display where external light including visible wavelength components having a plurality of colors is incident, i.e., a reflective display, becomes a black display in the voltage applied portion and becomes a white display in the voltage unapplied portion, respectively. On the other hand, a transmissive display with the light from the light source 17 becomes a display having the color of the light emitted from the cold cathode tube 50, i.e., a white display, in the voltage applied portion, and becomes a black display in the voltage unapplied portion.

Figure 6:
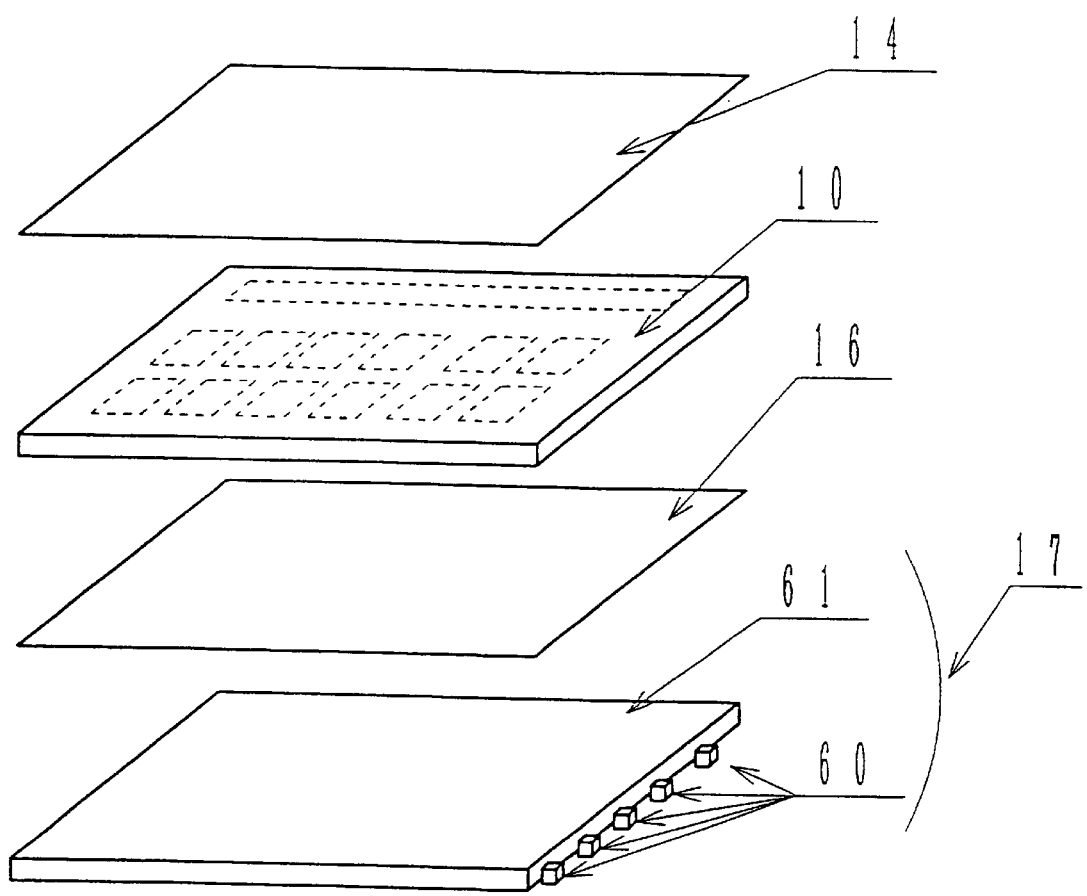
FIG. 6 is a drawing illustrating another example of a light source used in the present invention.

The light source 17 used for the display device shown in FIG. 6 comprises a LED 60 which emits light at a red wavelength, and a light guide plate 61. In use of the light source 17 shown in FIG. 6 for the display device of this embodiment, a reflective display becomes a black display in the voltage applied portion and becomes a white display in the voltage unapplied portions, respectively. On the other hand, a transmissive display using light from the light source 17 becomes a display having the color of the light emitted from the LED 60, i.e., a red display, in the voltage applied portion, and becomes a black display in the voltage unapplied portion.

In use of the light source 17 shown in FIG. 5, as described above, for light from the light source 17, a dark display is obtained in the voltage unapplied portion and a bright display is obtained in the voltage applied portion, respectively, to form a transmissive display. However, in this case, when external light is incident on the front side of the display device, a bright display is obtained in the voltage unapplied portion and a dark display is obtained in the voltage applied portion, respectively, due to the external light. As a result, in both the voltage unapplied portion and the voltage applied portion, for example, when a display with transmitted light from the light source 17 is a bright display, a gray display is obtained due to addition of a reflective dark display by external light, and when a display with transmitted light from the light source 17 is a dark display, a gray display is also obtained due to addition of a reflective bright display by external light, to cause so-called positive-negative reversal and sometimes makes the display hard to see.

When the light source 17 shown in FIG. 6 is turned on at incidence of external light, in the voltage applied portion, the light emitted from the LED can be seen so as to make the display grayish red, and in the voltage unapplied portion, the light reflected by the polarized light separator 16 can be seen so as to make the display gray. Therefore, the display is significantly easier to see as compared with a simple black-and-white display.

The LED 60 which emits light having a red wavelength is used in FIG. 6, but an LED which emits light having the wavelength of a color other than red may be used.

Figure 7:
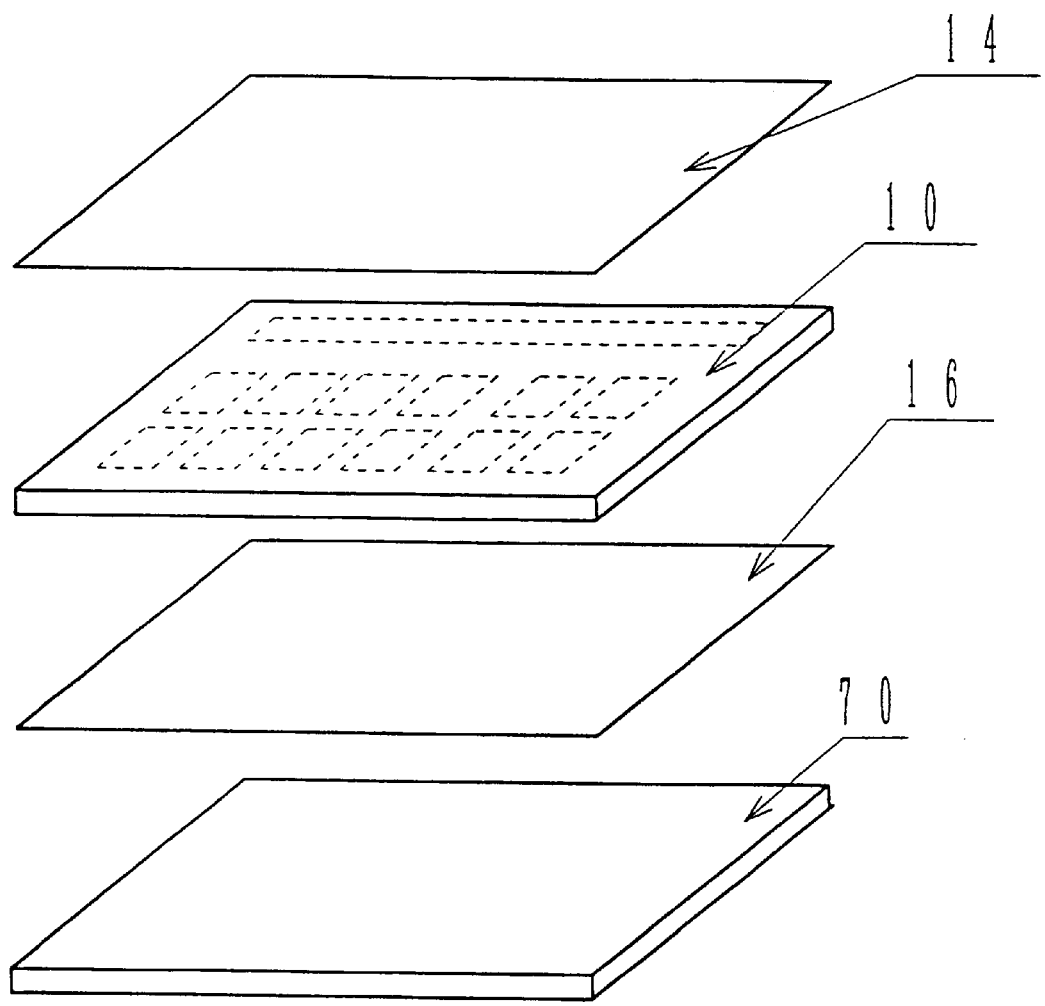
FIG. 7 is a drawing illustrating still another example of a light source used in the present invention.

The light source 17 used for the display device shown in FIG. 7 comprises an EL element 70 as a light source 17, which emits light having a green wavelength. In use of the light source 17 shown in FIG. 7 for the display device of this embodiment, a reflective display becomes a black display in the voltage applied portion, and becomes a white display in the voltage unapplied portion, respectively. On the other hand, a transmissive display by the light from the light source 17 becomes a display having the color of the light emitted from the EL element 70, i.e., a green display, in the voltage applied portion, and becomes a black display in the voltage unapplied portion. When the light source 17 shown in FIG. 7 is turned on at incidence of external light, in the voltage applied portion, the light emitted from the EL element 70 can be seen so as to make the display grayish green, and in the voltage unapplied portion, the external light reflected by the polarized light separator 16 can be seen so as to make the display gray. The EL element 70 which emits light having a green wavelength is used in FIG. 7, but, of course, an EL element which emits light having the wavelength of a color other than green may be used.

Figure 8:
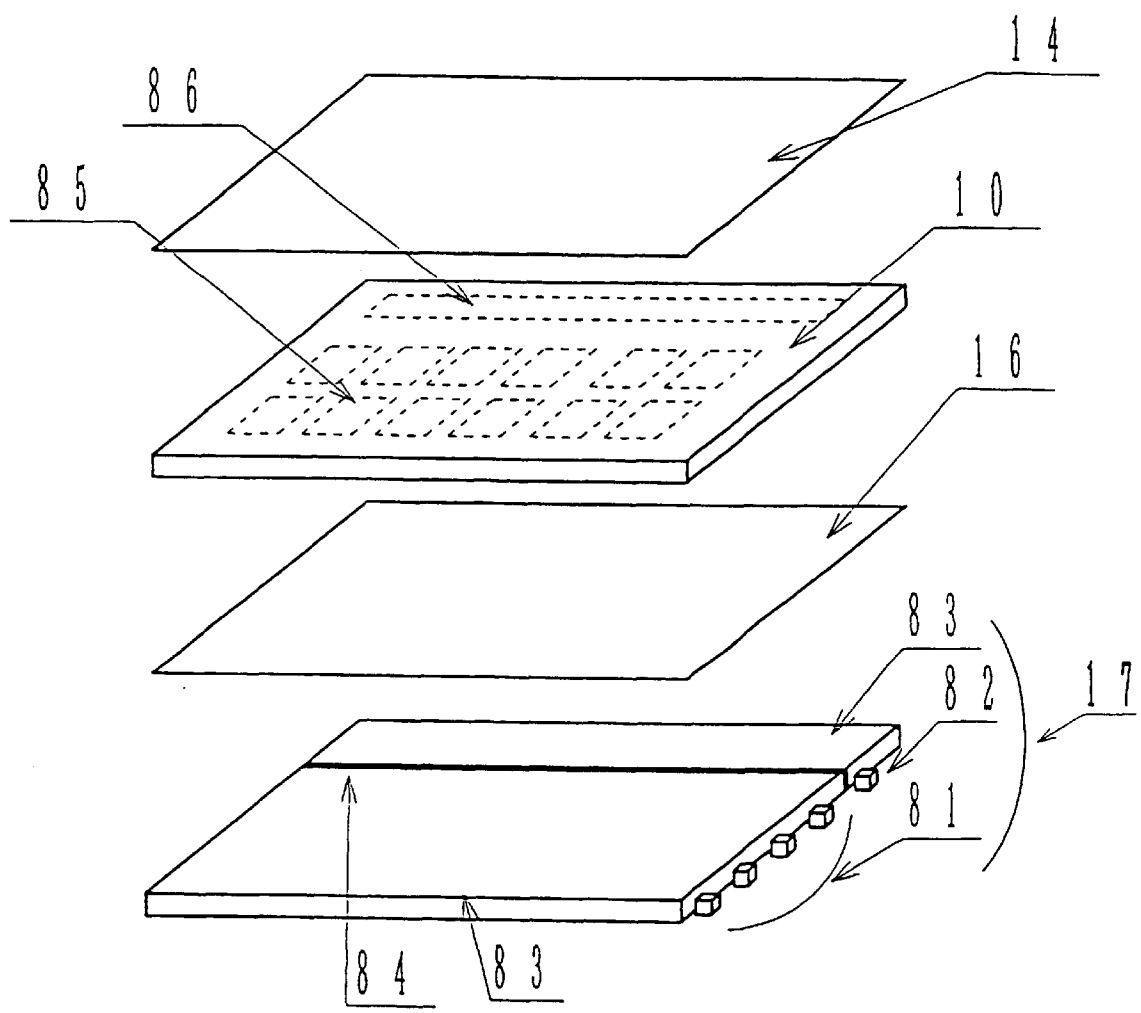
FIG. 8 is a drawing illustrating a further example of a light source used in the present invention.

The light source 17 used for the display device shown in FIG. 8 comprises an LED 81 which emits light having a red wavelength, and an LED 82 which emits light having a blue wavelength, both LEDs being disposed on the side of a light guide plate 83. The light guide plate 83 is partitioned by a reflecting plate 84 into regions corresponding to the LEDs so as not to mix light having the wavelengths emitted from the respective light guide plates 83. The LEDs are arranged so that the emitted lights correspond to a plurality of character display portions 85 and 86 formed in the liquid crystal panel 10. In use of the light source 17 shown in FIG. 8 for the display device of this embodiment, a reflective display becomes a black display in the voltage applied portion and becomes a white display in the voltage unapplied portion, respectively. On the other hand, a transmissive display with the light from the light source 17 becomes a display having the color of the light emitted from each of the LEDs in the corresponding character display portion, i.e., a red or blue display, in the voltage applied portion, and becomes a black display in the voltage unapplied portion. When the light source 17 shown in FIG. 8 is turned on at incidence of external light, in the voltage applied portion, the light emitted from each of the LEDs can be seen to make the display grayish red or blue in each of the character display portions 84 and 86, and in the voltage unapplied portion, external light reflected by the polarized light separator 16 can be seen to make the display gray. As shown in FIG. 8, the LED which emits light having a red wavelength and the LED which emits light having a blue wavelength are used, but, of course, an LED which emits light having the wavelength of a color other than these colors may be used, and combinations may be appropriately selected according to application.

Figure 9:
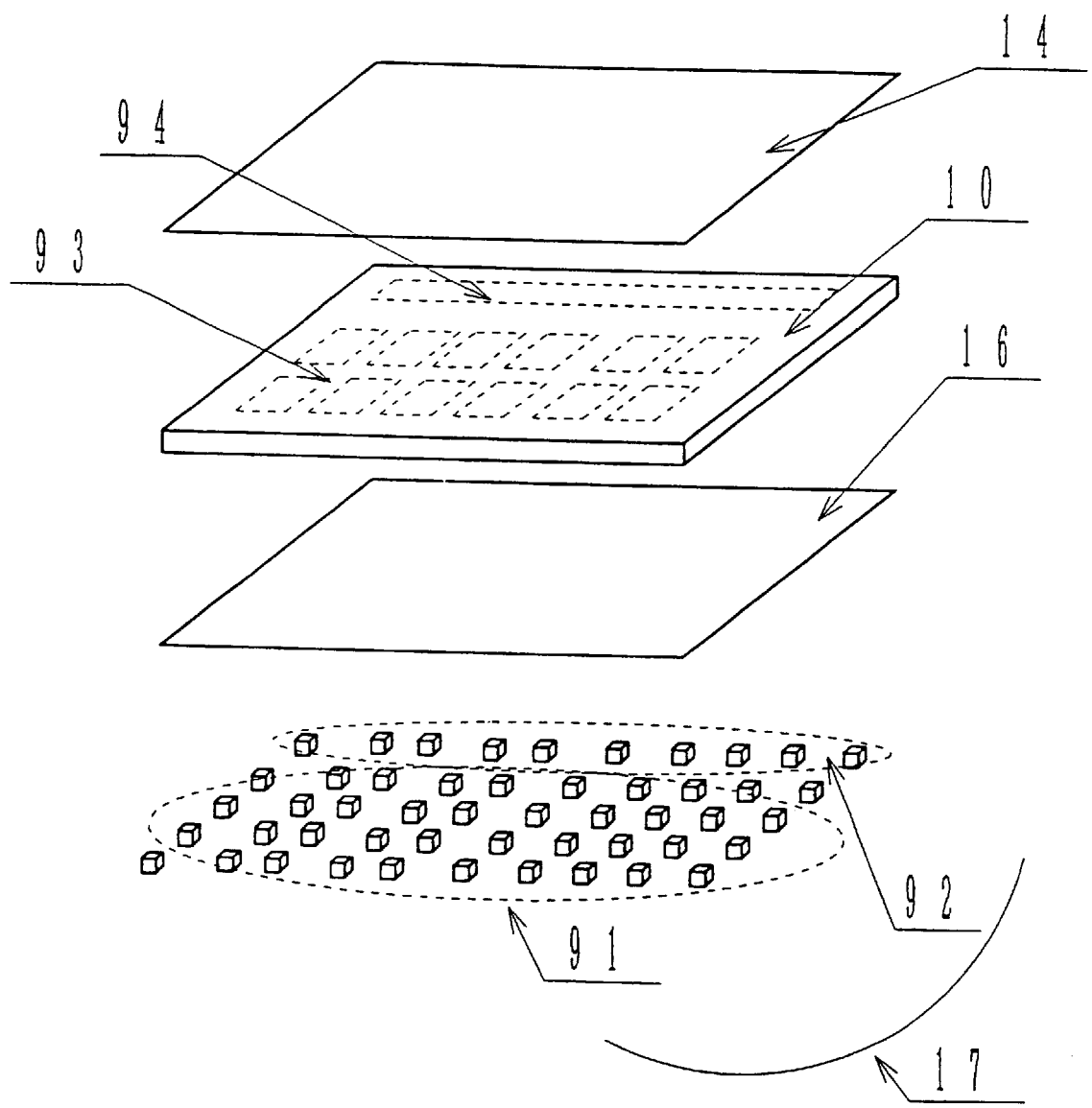
FIG. 9 is a drawing illustrating a still further example of a light source used in the present invention.

The light source 17 used for the display device shown in FIG. 9 comprises a plurality of LEDs 91 which emit light having a red wavelength, and a plurality of LEDs 92 which emit light having a blue wavelength, with the LEDs arranged as a group for each of the colors. The light source 17 shown in FIG. 9 has no light guide plate. Further, the LED groups are arranged so that the emitted lights respectively correspond to a plurality of character display portions 93 and 94 formed in the liquid crystal panel 10. In use of the light source 17 shown in FIG. 9 for the display device of this embodiment, a reflective display becomes a black display in the voltage applied portion and becomes a white display in the voltage unapplied portion, respectively. On the other hand, a transmissive display by the light from the light source 17 becomes a display having the color of the light emitted from each of the LED groups respectively corresponding to the character display portions 93 and 94, i.e., a red or blue display, in the voltage applied portion, and becomes a black display in the voltage unapplied portion. When the light source 17 shown in FIG. 9 is turned on at incidence of external light, light emitted from each of the LED groups can be seen to make the display grayish red or blue in each of the character display portions 93 and 94 in the voltage applied portion, and external light reflected by the polarized light separator 16 can be seen to make the display gray in the voltage unapplied portion. The LED 91 which emits light having the red wavelength and the LED 92 which emits light having the blue wavelength are used in FIG. 9, but, of course, an LED which emits light having the wavelength of a color other than these colors may be used, and combinations can be appropriately selected.

Second Embodiment

Figure 10:
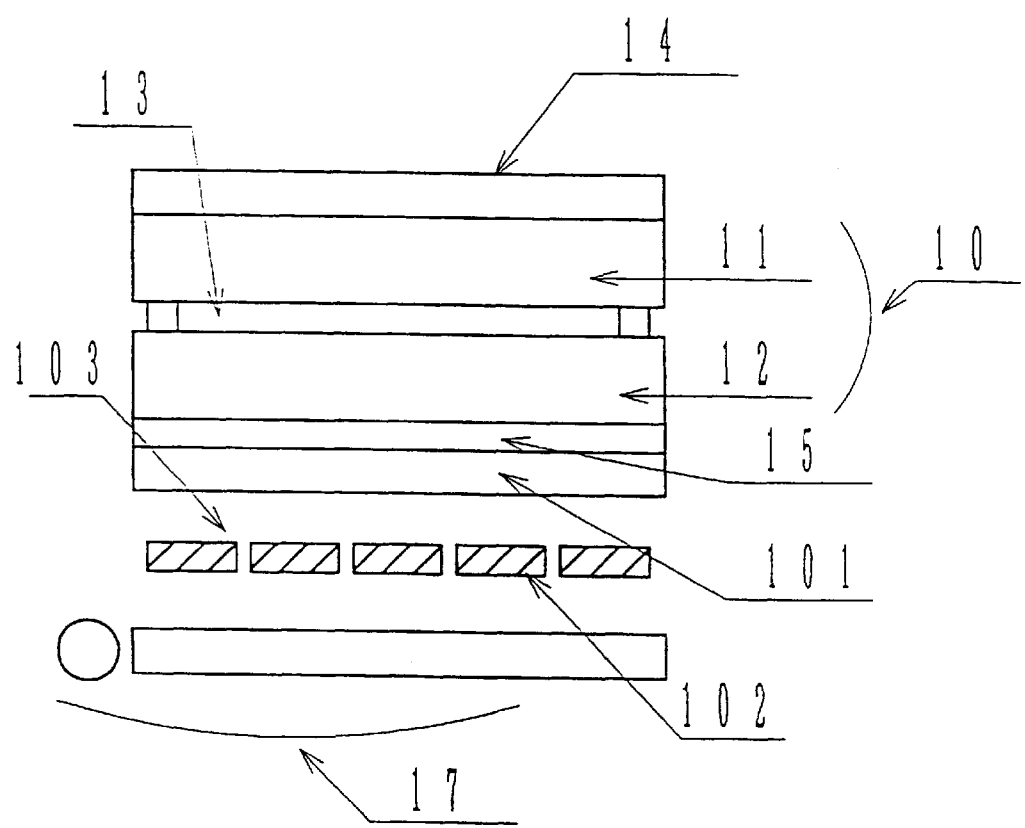
FIG. 10 is a sectional view of a display device in accordance with a second embodiment of the present invention.
Figure 11:
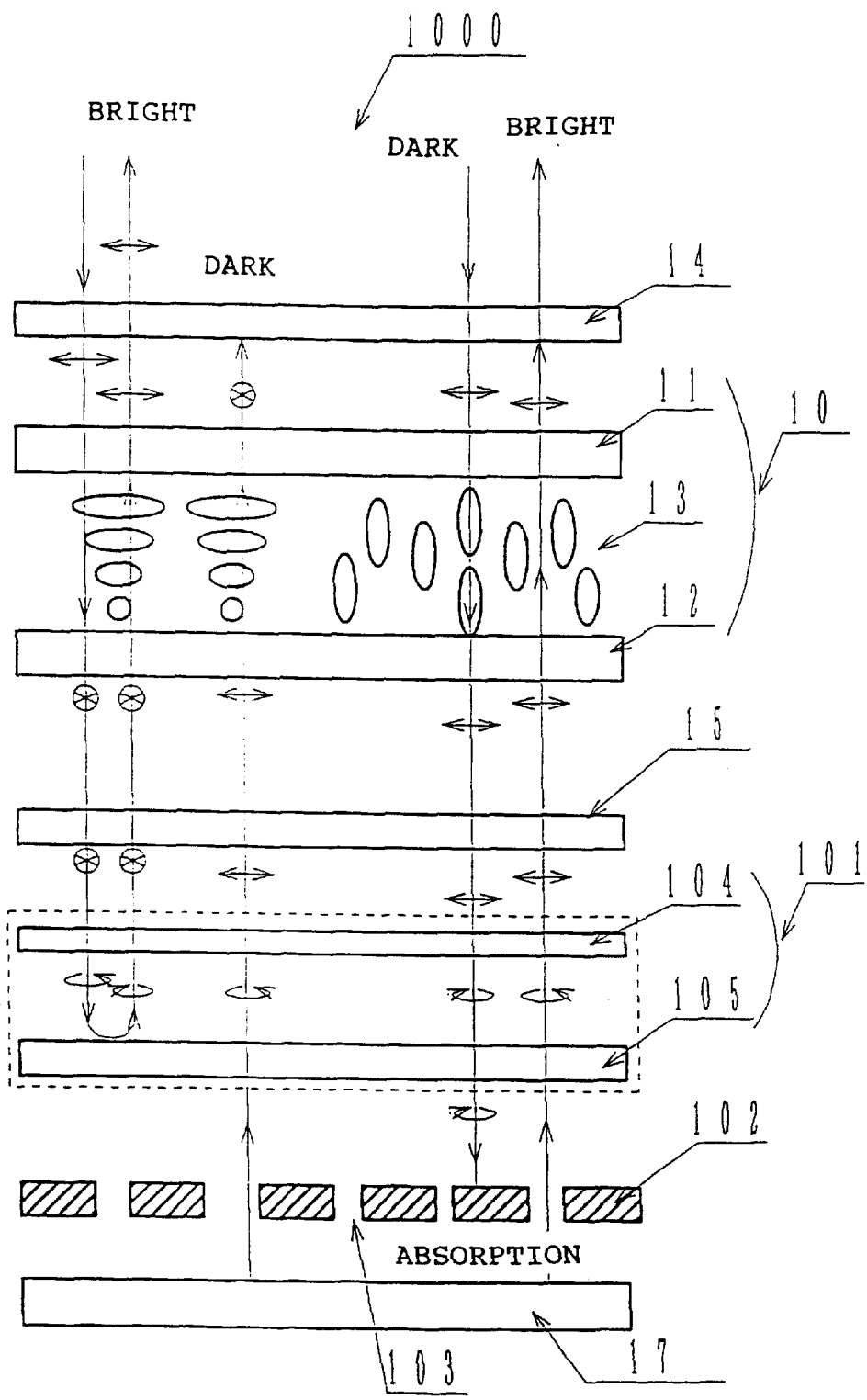
FIG. 11 is a schematic sectional view illustrating the principle of display of the display device in accordance with the second embodiment of the present invention.

FIG. 10 is a sectional view of a display device in accordance with a second embodiment of the present invention, and FIG. 11 is a schematic sectional view illustrating the principle of display of the display device in the second embodiment of the invention.

The display device 1000 of this embodiment is a reflective display device with a so-called transflective function, which is capable of not only a reflective display using reflection of external light at a place with external light, but also a transmissive display using light from the light source 17 at a place without external light.

Basic Structure

First, the structure of the display device of this embodiment is descried below with reference to FIG. 10. In the display device 1000, a TN liquid crystal panel 10 is used as a polarization changing element axis optical element. In the TN liquid crystal panel 10, a TN liquid crystal 13 is held between two glass plates 11 and 12, and a plurality of character display portions (not shown in the drawing) are provided to enable character display. On the upper side of the TN liquid crystal panel 10 is provided a polarizer 14. On the lower side of the TN liquid crystal panel 10 are provided a light scattering member 15, a polarized light separator 101, a light absorber 102, and a light source 17 in this order. The light absorber 102 is black and has a plurality of openings 103 at a predetermined area density. In order to drive the TN liquid crystal 13, a TAB substrate (not shown in the drawing) provided with a driver IC is connected to the TN liquid crystal panel 10 to form the display device.

Polarized Light Separator)

The polarized light separator 101 comprises a (¼) λ plate 104 and a cholesteric liquid crystal layer 105. The cholesteric liquid crystal layer 105 is light having the same wavelength as the pitch of the liquid crystal and reflects circularly polarized light with the same direction of rotation as the liquid crystal, and transmits other light. Therefore, for example, when a cholesteric liquid crystal having a pitch of 5000 angstroms and counterclockwise rotation is used for the cholesteric liquid crystal layer 105, a device is obtained in which left-handed circularly polarized light having a wavelength of 5000 angstroms is reflected, and right-handed circularly polarized light and light having other wavelengths are transmitted. Further, by using a cholesteric liquid crystal having counterclockwise rotation and changing the pitch thereof in the cholesteric liquid crystal over the whole wavelength range of visible light, an element is obtained which reflects left-handed circularly polarized light not only for monochrome light, but also over the whole range of bright color light, and transmits right-handed circularly polarized light. In this embodiment, a cholesteric liquid crystal having counterclockwise rotation is used for the cholesteric liquid crystal layer 105, and the pitch thereof is changed in the cholesteric liquid crystal over the whole wavelength range of visible light.

In the polarized light separator 101 comprising a combination of the cholesteric liquid crystal layer 105 and the (¼) λ plate 104, when linearly polarized light in the predetermined first direction is incident on the (¼) λ plate 104 side, the light is changed to left-handed circularly polarized light by the (¼) λ plate 104, reflected by the cholesteric liquid crystal layer 105, changed again to linearly polarized light in the predetermined first direction by the (¼) λ plate 104, and then emitted. When linearly polarized light in the second direction perpendicular to the first direction is incident, the light is changed to right-handed circularly polarized light by the (¼) λ plate 104, and transmitted through the cholesteric liquid crystal layer 105. For light incident on the lower side of the cholesteric liquid crystal layer 105, linearly polarized light in the second direction is emitted upward from the (¼) λ plate 104.

In this way, the polarized light separator 101 comprising combination of the cholesteric liquid crystal layer 105 and the (¼) λ plate 104 is polarized light separator 16 in which of light incident from the (¼) λ plate 104 side, a linearly polarized light component in the predetermined second direction is transmitted, and linearly polarized light component in the first direction perpendicular to the predetermined second direction is reflected, and for light incident on the cholesteric liquid crystal layer 105 side, linearly polarized light in the second direction can be emitted to the (¼) λ plate 104 side. Besides the polarized light separator 101 comprising combination of the cholesteric liquid crystal layer 105 and the (¼) λ plate 104, polarized light separator 101 having the above function include a separator comprising films laminated in multilayers (U.S. Pat. No. 4,974,219), a separator for separating into reflective polarized light and transmissive polarized light using the Brewster angle (SID 92DIGEST pp. 427–429), a separator using a hologram, and the polarized light separator described above in the first embodiment with reference to FIGS. 3 and 4, i.e., the separator disclosed in Unexamined International Applications (International Application Nos. WO95/27819 and WO95/17692).

Principle of Display

On the assumption that the right half of the display device 1000 is a voltage applied portion, and the left half thereof is a voltage unapplied portion, the principle of display by the display device 1000 is described.

First, a reflective display where external light is incident on the display device 1000 is described.

In the voltage unapplied portion on the left hand side, when external light is incident on the display device 1000, the external light is changed to linearly polarized light parallel to the drawing by the polarizer 14, and then the direction of polarization is rotated 90° by the TN liquid crystal 13 to form linearly polarized light perpendicular to the drawing. The linearly polarized light perpendicular to the drawing is changed to left-handed circularly polarized light by the (¼) λ plate 104, reflected by the cholesteric liquid crystal layer 105, is again incident on the (¼) λ plate 104, and changed to linearly polarized light perpendicular to the drawing by the (¼) λ plate 104. Then, the direction of polarization is rotated 90° by the TN liquid crystal 13 to form linearly polarized light parallel to the drawing, which is emitted as linearly polarized light parallel to the drawing from the polarizer 14. In this way, with no voltage applied, since incident external light is reflected by the polarized light separator 101, not absorbed thereby, a bright reflective display can be obtained. Since the light scattering member 15 is provided between the polarized light separator 101 and the TN liquid crystal panel 10, light reflected by the polarized light separator 101 is changed from a mirror state to a bright color state.

In the voltage applied portion on the right hand side, when external light is incident on the display device 1000, the external light is changed to linearly polarized light parallel to the drawing by the polarizer 14, and then transmitted through the TN liquid crystal 13 without changing the direction of polarization. The linearly polarized light is changed to right-handed circularly polarized light by the (¼) λ plate 104, and transmitted through the cholesteric liquid crystal layer 105. The right-handed circularly polarized light transmitted through the cholesteric liquid crystal layer 105 is absorbed by the black light absorber 102 to obtain a dark display.

In this way, in a reflective display where external light is incident on the display device 1000, in the voltage unapplied portion, light reflected by the polarized light separator 101 is transmitted through the light scattering member 15 to obtain a bright display, and in the voltage applied portion, light transmitted through the polarized light separator 101 is absorbed by the light absorber 102 to obtain a dark display.

With no voltage applied, since external light incident on the display device 1000 is reflected by the polarized separator 101, not absorbed thereby, a bright display is obtained.

Next, a transmissive display by the light from the light source 17 is described.

In the voltage unapplied portion on the left hand side, light from the light source 17 is incident on the cholesteric liquid crystal layer 105 of the polarized light separator 101 through the openings 103 provided in the black light absorber 102, and only right-handed circularly polarized light is transmitted through the cholesteric liquid crystal layer 105, and changed to linearly polarized light parallel to the drawing by the (¼) λ plate 104. Then, the direction of polarization is rotated 90° by the TN liquid crystal 13 to form linearly polarized light perpendicular to the drawing, which is absorbed by the polarizer 14 to obtain dark display.

In the voltage applied portion on the right hand side, light from the light source 17 is incident on the polarized light separator 101 and on the cholesteric liquid crystal layer 105 through the openings 103 provided in the black light absorber 102, and only right-handed circularly polarized light is transmitted through the cholesteric liquid crystal layer 105 and changed to linearly polarized light parallel to the drawing by the (¼) λ plate 104. The linearly polarized light is transmitted through the light scattering member 15, through the TN liquid crystal 13 without changing the direction of polarization, and then through the polarizer 14 to obtain a bright display.

In this way, in a transmissive display by the light from the light source 17, in the voltage unapplied portion, light from the light source 17 is absorbed by the polarizer 14 to obtain a dark display, and in the voltage applied portion, light from the light source 17 is transmitted through the polarizer 14 to obtain a bright display.

Therefore, the display device 1000 of this embodiment is a reflective display device with a so-called transflective function, which is capable of not only a bright reflective display using reflection of external light at a place with external light, but also a transmissive display using light from the light source 17 at a place with external light.

Light Scattering Member

As the light scattering member 15 used in the display device of this embodiment, a light scattering member 15 capable of emitting incident light with minimal change in the state of polarization is used. Since this light scattering member 15 has the function to scatter and cloud the light emitted from the light scattering member 15, a display device with a cloudy display (white display) is obtained. In contrast, removal of the light scattering member 15 from the configuration produces a display device with a glossy display. Therefore, the light scattering member 15 may be selected in accordance with application of the display device.

(Light Absorber)

In this embodiment, in a reflective display where external light is incident on the display device 1000, the two display states, i.e., a bright display by the light reflected by the polarized light separator 101, and a dark display where light transmitted through the polarized light separator 101 is absorbed by the light absorber 102, are obtained, as described above. However, since the light absorber 102 is a black light absorber that absorbs light from the polarized light separator 101 and has a plurality of the openings 103 through which light can be transmitted, in the dark display state, light is not completely absorbed by the light absorber 102, but some light is transmitted through the openings 103 of the light absorber 102, reflected by the light source 17 or the like, again transmitted through the openings 103 of the light absorber 102, and returned to the TN liquid crystal panel 10 side, causing a decrease in contrast.

Therefore, the area ratio of the openings 103 to the light absorber 102 is preferably limited to decrease the amount of the light which is transmitted through the openings 103 of the light absorber 102, reflected by the light source 17 or the like, and returned through the openings 103 of the light absorber 102, thereby suppressing a decrease in contrast.

Although, in this embodiment, a black light absorber having the plurality of openings 103 is used as the light absorber 102, a light absorber in a gray translucent state can also be used for absorbing light from the polarized light separator 101 side and for transmitting light from the light source 17 to the polarized light separator 101 side. In this case, since the light absorber 102 is in a gray translucent state, the openings 103 need not be provided. As the light absorber 102 in a gray translucent state, light diffusion film D202 (produced by Tsujimoto Denki Seisakusho) or the like can be used.

Although the black light absorber 102 having the plurality of openings 103 is used as the light absorber 102, a polarizer having an absorption axis shifted from the reflection axis of the polarized light separator 101 can be used in place of the light absorber 102. In this way, with the polarized light separator 101 and the polarizer having an absorption axis shifted from that of the polarized light separator 101, light from the TN liquid crystal panel 10 side can be absorbed and light from the light source 17 can be transmitted to the TN liquid crystal panel 10 side.

Light Source

In the display device of this embodiment, the various light sources 17 shown in FIGS. 1 to 9 and described in the first embodiment can be used. The operation and advantages are the same as the first embodiment, and thus description thereof is omitted.

Third Embodiment

Basic Structure

Figure 12:
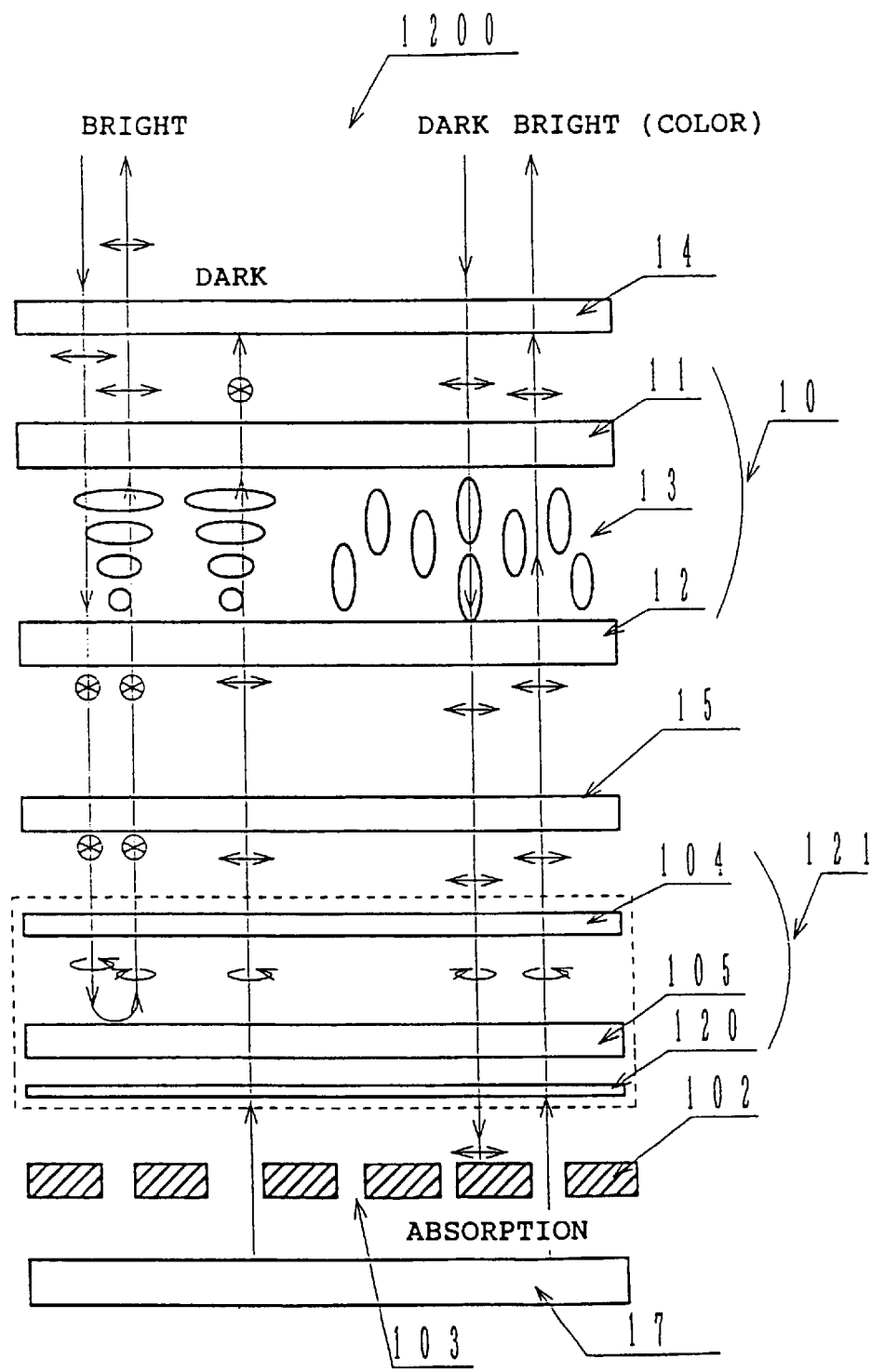
FIG. 12 is a schematic sectional view illustrating a display device in accordance with a third embodiment of the present invention.

FIG. 12 is a schematic sectional view illustrating a display device in accordance with a third embodiment of the invention.

In the second embodiment, the polarized light separator 101 comprising the (¼) λ plate 104 and the cholesteric liquid crystal layer 105 is used. This embodiment is different from the second embodiment in that a polarized light separator 121 comprising a (¼) λ plate 104, a cholesteric liquid crystal layer 105, and a (¼) λ plate 120 is used in place of the polarized light separator 101, but other points are the same as the second embodiment.

Polarized Light Separator

In the polarized light separator 121 comprising the (¼) λ plates 104 and 120 on both sides of the cholesteric liquid crystal layer 105, when linearly polarized light in the predetermined first direction is incident on the (¼) λ plate 104 side, the light is changed to left-handed circularly polarized light by the (¼) λ plate 104, reflected by the cholesteric liquid crystal layer 105, changed again to linearly polarized light in the predetermined first direction by the (¼) λ plate 104, and then emitted. When linearly polarized light in the second direction perpendicular to the first direction is incident, the light is changed to right-handed circularly polarized light by the (¼) λ plate 104, transmitted through the cholesteric liquid crystal layer 105, again changed to linearly polarized light in the second direction by the (¼) λ plate 120, and then emitted. For light incident on the lower side of the (¼) λ plate 104, linearly polarized light in the second direction is emitted upward from the (¼) λ plate 104.

In this way, the polarized light separator 121 comprising a combination of the cholesteric liquid crystal layer 105 and the (¼) λ plates 104 and 120 is polarized light separator in which of light incident on the (¼) λ plate 104 side, a linearly polarized light component in the predetermined second direction is transmitted, and a linearly polarized light component in the first direction perpendicular to the predetermined second direction is reflected, and for light incident on the (¼) λ plate 120 side, linearly polarized light in the second direction can be emitted to the (¼) λ plate 104 side. Besides the polarized light separator 121 comprising a combination of the cholesteric liquid crystal layer 105 and the (¼) λ plates 104 and 120, polarized light separators having the above function include a separator comprising films laminated in multilayers (U.S. Pat. No. 4,974,219), a separator for separating into reflected polarized light and transmitted polarized light by using a Brewster angle (SID 92DIGEST pp. 427–429), a separator using a hologram, and the polarized light separator described above in the first embodiment with reference to FIGS. 3 and 4, i.e., the separator disclosed as a reflective polarizer in Unexamined International Applications (International Application Nos. WO95/27819 and WO95/17692).

Principle of Display

On the assumption that the right half of the display device 1200 is a voltage applied portion, and the left half thereof is a voltage unapplied portion, the principle of display by the display device 1200 is described.

First, a reflective display where external light is incident on the display device 1200 is described.

The function of the voltage unapplied portion on the left hand side is the same as the voltage unapplied portion of the first embodiment. Namely, when external light is incident on the display device 1200, the external light is changed to linearly polarized light parallel to the drawing by the polarizer 14, and then the direction of polarization is rotated 90° by the TN liquid crystal 13 to form linearly polarized light perpendicular to the drawing. The linearly polarized light perpendicular to the drawing is changed to left-handed circularly polarized light by the (¼) λ plate 104, reflected by the cholesteric liquid crystal layer 105 to be incident again on the (¼) λ plate 104, and changed to linearly polarized light perpendicular to the drawing by the (¼) λ plate 104. Then the direction of polarization is rotated 90° by the TN liquid crystal 13 to form linearly polarized light parallel to the drawing, which is emitted as linearly polarized light parallel to the drawing from the polarizer 14. In this way, with no voltage applied, incident external light is reflected by the polarized light separator 121, not absorbed thereby, to obtain a bright reflective display. Since the light scattering member 15 is provided between the (¼) λ plate 104 and the TN liquid crystal panel 10, light reflected by the polarized light separator 121 is changed from a mirror state to a white state.

In the voltage applied portion on the right hand side, when external light is incident on the display device 1200, the external light is changed to linearly polarized light parallel to the drawing by the polarizer 14, and then transmitted through the TN liquid crystal 13 without changing the direction of polarization. The linearly polarized light is changed to right-handed circularly polarized light by the (¼) λ plate 104, and transmitted through the cholesteric liquid crystal layer 105. The right-handed circularly polarized light transmitted through the cholesteric liquid crystal layer 105 is changed to linearly polarized light parallel to the drawing by the (¼) λ plate 120, and then absorbed by the black light absorber 102 to obtain dark display.

In this way, in a reflective display where external light is incident on the display device 1200, in the voltage unapplied portion, light is reflected by the polarized light separator 121 to obtain a bright display, and in the voltage applied portion, light transmitted through the polarized light separator 121 is absorbed by the light absorber 102 to obtain a dark display.

With no voltage applied, since external light incident on the display device 1200 is reflected by the polarized separator 121, not absorbed thereby, a bright display is obtained.

Next, a transmissive display with the light from the light source 17 is described.

In the voltage unapplied portion on the left hand side, light from the light source 17 is incident on the (¼) λ plate 120 of the polarized light separator 121 through the openings 103 provided in the black light absorber 102, transmitted through the (¼) λ plate 120 to be incident on the cholesteric liquid crystal layer 105, in which right-handed circularly polarized light is transmitted, and left-handed circularly polarized light is reflected. The transmitted circularly polarized light is changed to linearly polarized light parallel to the drawing by the (¼) λ plate 104. Then the direction of polarization is rotated 90° by the TN liquid crystal 13 to form linearly polarized light perpendicular to the drawing, which is absorbed by the polarizer 14 to obtain a dark display.

In the voltage applied portion on the right hand side, light from the light source 17 is incident on the (¼) λ plate 120 of the polarized light separator 121 through the openings 103 provided in the black light absorber 102, and only right-handed circularly polarized light of the light incident on the cholesteric liquid crystal layer 105 is transmitted therethrough and changed to linearly polarized light parallel to the drawing by the (¼) λ plate 104. The linearly polarized light is transmitted through the light scattering member 15, through the TN liquid crystal 13 without changing the direction of polarization, and then through the polarizer 14 to obtain a bright display.

In this way, in a transmissive display with the light from the light source 17, in the voltage unapplied portion, light from the light source 17 is absorbed by the polarizer 14 to obtain a dark display, and in the voltage applied portion, light from the light source 17 is transmitted through the polarizer 14 to obtain a bright display.

Therefore, the display device 1200 of this embodiment is a reflective display device with a so-called transflective function, which is capable of not only a bright reflective display using reflection of external light in a place with external light, but also a transmissive display using light from the light source 17 in a place without external light.

Light Scattering Member

As the light scattering member 15 used in the display device of this embodiment, a light scattering member 15 capable of emitting incident light with minimal change in the state of polarization is used. Since this light scattering member 15 has the function to scatter and cloud the light emitted from the light scattering member 15, a display device with a cloudy display (white display) is obtained. In contrast, removal of the light scattering member 15 from the configuration produces a display device with a glossy display. Therefore, the light scattering member 15 should be selected in accordance with application of the display device.

(Light Absorber 102)

The same light absorber 102 as that used in the second embodiment can be used in this embodiment. By limiting the area ratio of the openings 103 to the light absorber 102, a decrease in contrast can be suppressed as described in the second embodiment. Of course, like in the second embodiment, a light absorber 102 in a gray translucent state and a polarizer having an absorption axis shifted from the reflection axis of the polarized light separator 121 can also be used.

Light Source In the display device of this embodiment, the various light source 17 described in FIGS. 1 to 9 and the first embodiment can be used. The operation and advantages are the same as the first embodiment, and thus description thereof is omitted.

Fourth Embodiment (Basic Structure)

Figure 13:
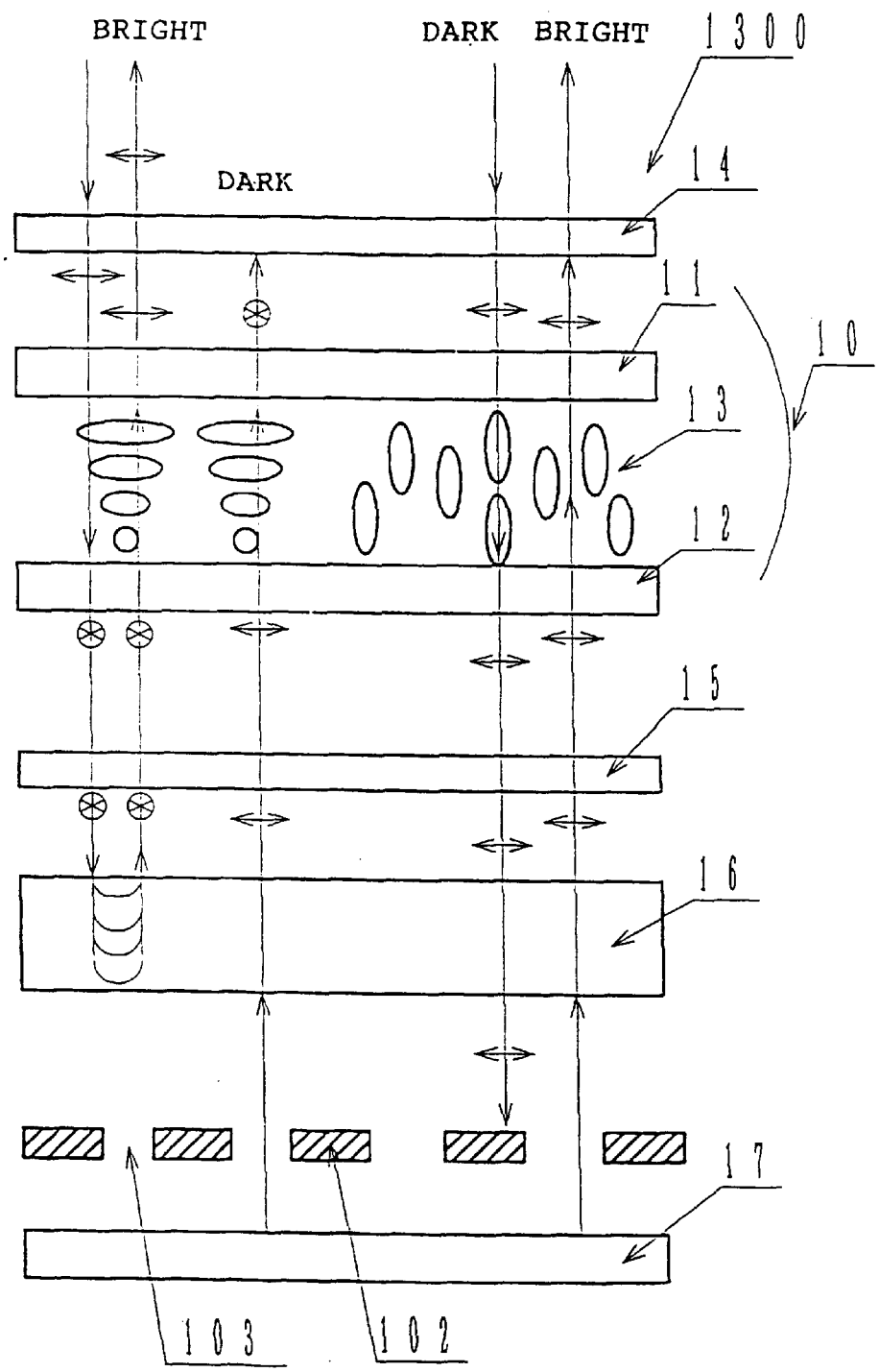
FIG. 13 is a schematic sectional view illustrating a display device in accordance with a fourth embodiment of the present invention.

FIG. 13 is a schematic sectional view illustrating a display device in a fourth embodiment of the invention.

The polarized light separator 101 comprising the (¼) λ plate 104 and the cholesteric liquid crystal layer 105 is used in the second embodiment, and the polarized light separator 121 comprising the (¼) λ plate 104, the cholesteric liquid crystal layer 105 and the (¼) λ plate 120 is used in the third embodiment. This embodiment is different from the second and third embodiments in that the polarized light separator described above in the first embodiment with reference to FIGS. 3 and 4, i.e., the separator disclosed as a reflective polarizer in Unexamined International Applications (International Application Nos. WO95/27819 and WO95/17692) is used as the polarized light separator 16 instead of the polarized light separator 101 and 121, but other points are the same as the second and third embodiments.

Polarized Light Separator

Figure 3:
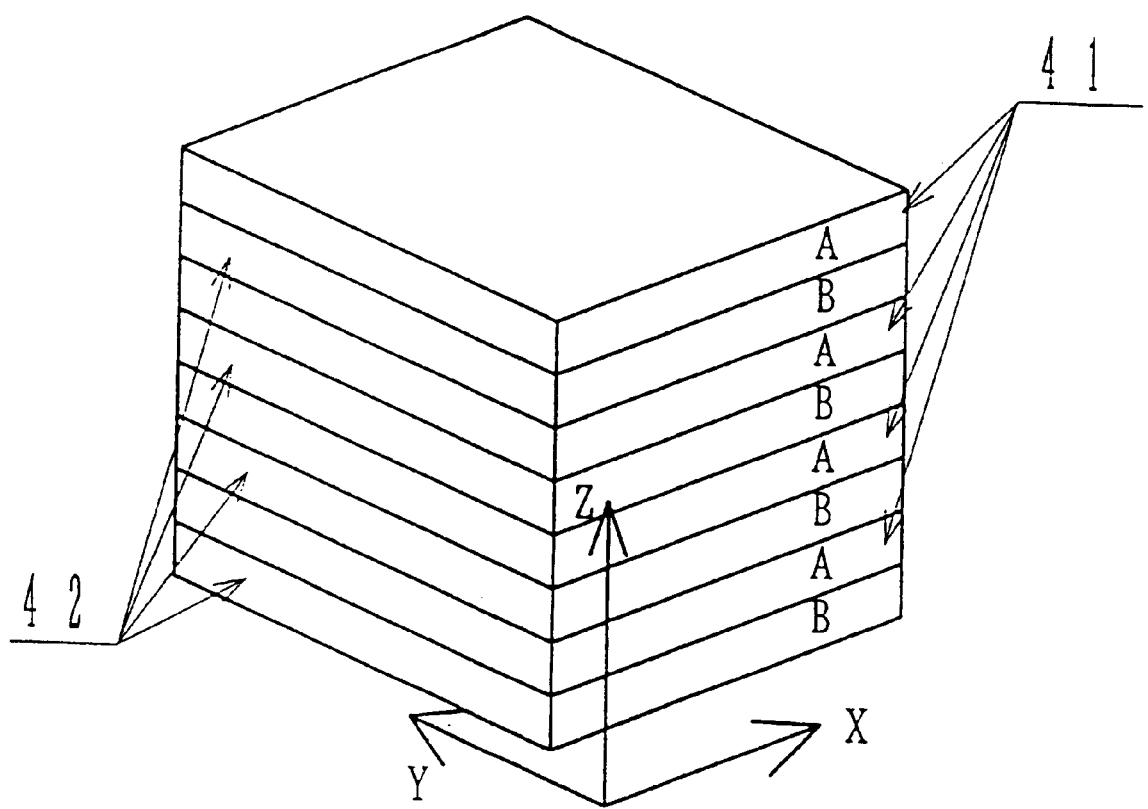
FIG. 3 is a schematic drawing of the configuration of a polarized light separator 16 used in an embodiment of the present invention.
Figure 4:
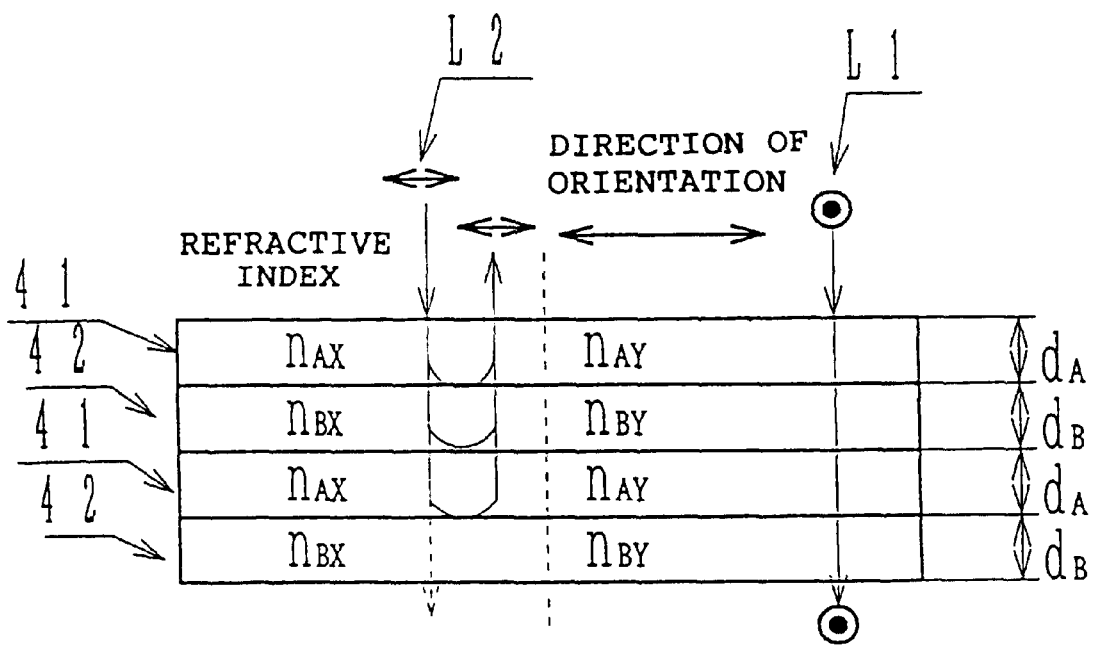
FIG. 4 is a drawing illustrating the operation of the polarized light separator 16 shown in FIG. 3.

In this embodiment, the same as described above in the first embodiment with reference to FIGS. 3 and 4 is used. Detailed description of the polarized light separator 16 is omitted. Of course, besides this polarized light separator 16, polarized light separators having the same function as described above include a separator comprising a cholesteric liquid crystal layer between λ/4 plates, a separator using a Brewster angle (SID 92DIGEST pp. 427–429), a separator using a hologram, and the like. These separators may be used in the display device of this embodiment.

Principle of Display

On the assumption that the right half of the display device 1300 is a voltage applied portion, and the left half thereof is a voltage unapplied portion, the principle of display by the display device 1300 is described.

First, a reflective display where external light is incident on the display device 1300 is described.

In the voltage unapplied portion on the left hand side, when external light is incident on the display device 1300, the external light is changed to linearly polarized light parallel to the drawing by the polarizer 14. And then the direction of polarization is rotated 90° by the TN liquid crystal 13 to form linearly polarized light perpendicular to the drawing, which is reflected by the polarized light separator 16, maintaining a state of the linearly polarized light perpendicular to the drawing. The direction of polarization is rotated 90° by the TN liquid crystal 13 to form linearly polarized light parallel to the drawing, which is emitted as linearly polarized light parallel to the drawing from the polarizer 14. In this way, with no voltage applied, incident external light is reflected by the polarized light separator 16, not absorbed thereby, to obtain a bright reflective display. Since the light scattering member 15 is provided between the polarized light separator 16 and the TN liquid crystal panel 10, light reflected by the polarized light separator 16 is changed from a mirror state to a bright color state.

In the voltage applied portion on the right hand side, when external light is incident on the display device 1300, the external light is changed to linearly polarized light parallel to the drawing by the polarizer 14, then transmitted through the TN liquid crystal 13 without changing the direction of polarization, then also transmitted through the polarized light separator 16 without changing the direction of polarization, and then absorbed by the black light absorber 102 to obtain a dark display.

In this way, in a reflective display where external light is incident on the display device 1300, in the voltage unapplied portion, light reflected by the polarized light separator 16 is transmitted through the light scattering member 15 to obtain a bright display, and in the voltage applied portion, light transmitted through the polarized light separator 16 is absorbed by the light absorber 102 to obtain a dark display.

With no voltage applied, since external light incident on the display device 1300 is reflected by the polarized separator 16, not absorbed thereby, a bright display is obtained.

Next, a transmissive display with the light from the light source 17 is described.

In the voltage unapplied portion on the left hand side, light from the light source 17 is incident on the polarized light separator 16 through the openings 103 provided in the black light absorber 102, and changed to linearly polarized light parallel to the drawing by the polarized light separator 16. Then the direction of polarization is rotated 90° by the TN liquid crystal 13 to form linearly polarized light perpendicular to the drawing, which is absorbed by the polarizer 14 to obtain a dark display.

In the voltage applied portion on the right hand side, light from the light source 17 is incident on the polarized light separator 16 through the openings 103 provided in the black light absorber 102, and changed to linearly polarized light parallel to the drawing by the polarized light separator 16. The linearly polarized light is scattered by the light scattering member 15, then transmitted through the TN liquid crystal 13 without changing the direction of polarization, and also transmitted through the polarizer 14 to obtain a bright display.

In this way, in a transmissive display by the light from the light source 17, in the voltage unapplied portion, light from the light source 17 is absorbed by the polarizer 14 to obtain a dark display, and in the voltage applied portion, light from the light source 17 is transmitted through the polarizer 14 to obtain a bright display.

Therefore, the display device 1300 of this embodiment is a reflective display device with a so-called transflective function, which is capable of not only a bright reflective display using reflection of external light in a place with external light, but also a transmissive display using light from the light source 17 in a place without external light.

Light Scattering Member

As the light scattering member 15 used in the display device of this embodiment, a light scattering member 15 capable of emitting incident light with minimal change in the state of polarization is used. Since this light scattering member 15 has the function to scatter and cloud the light emitted from the light scattering member 15, a display device with a cloudy display (white display) is obtained. In contrast, removal of the light scattering member 15 from the configuration produces a display device with glossy display. Therefore, the light scattering member 15 should be selected in accordance with application of the display device.

Light Absorber

The same light absorber 102 as that used in the second embodiment can be used in this embodiment. By limiting the area ratio of the openings 103 to the light absorber 102, a decrease in contrast can be suppressed as described in the second embodiment. Of course, like in the second embodiment, a light absorber 102 in a gray translucent state and a polarizer having an absorption axis shifted from the reflection axis of the polarized light separator 16 can also be used.

Light source

In the display device of this embodiment, the various light sources 17 described in FIGS. 1 to 9 and the first embodiment can be used. The operation and advantages are the same as the first embodiment, and thus description thereof is omitted.

Fifth Embodiment

Figure 14:
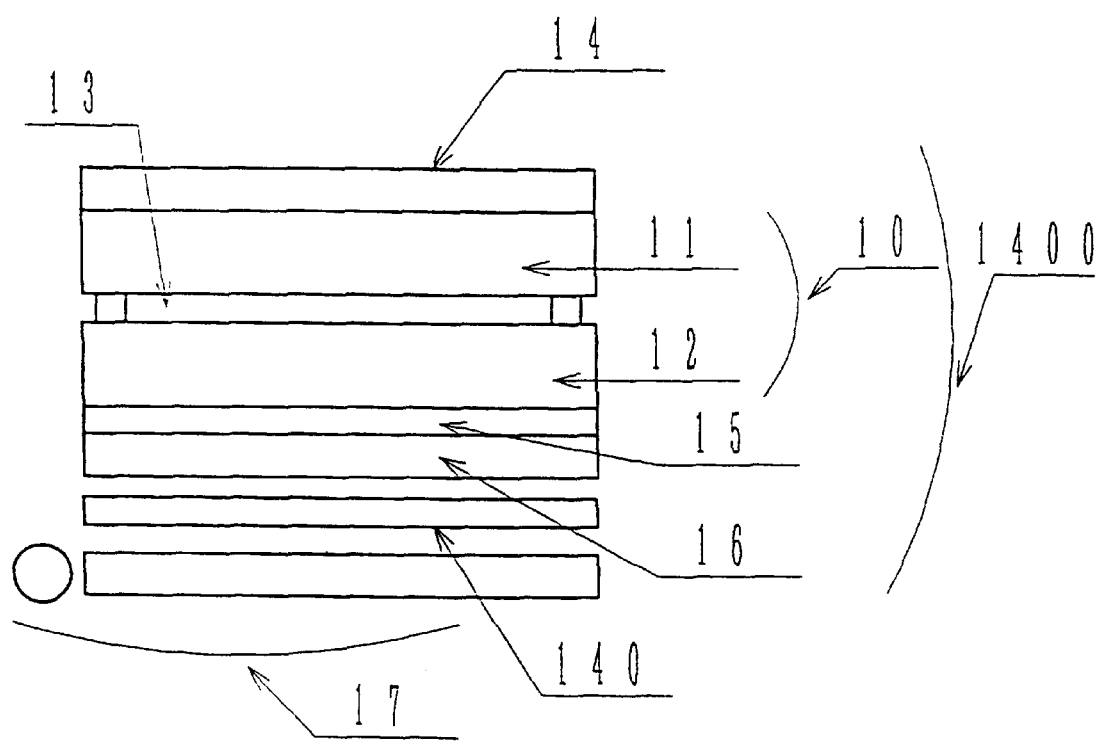
FIG. 14 is a sectional view of a display device in accordance with a fifth embodiment of the present invention.
Figure 15:
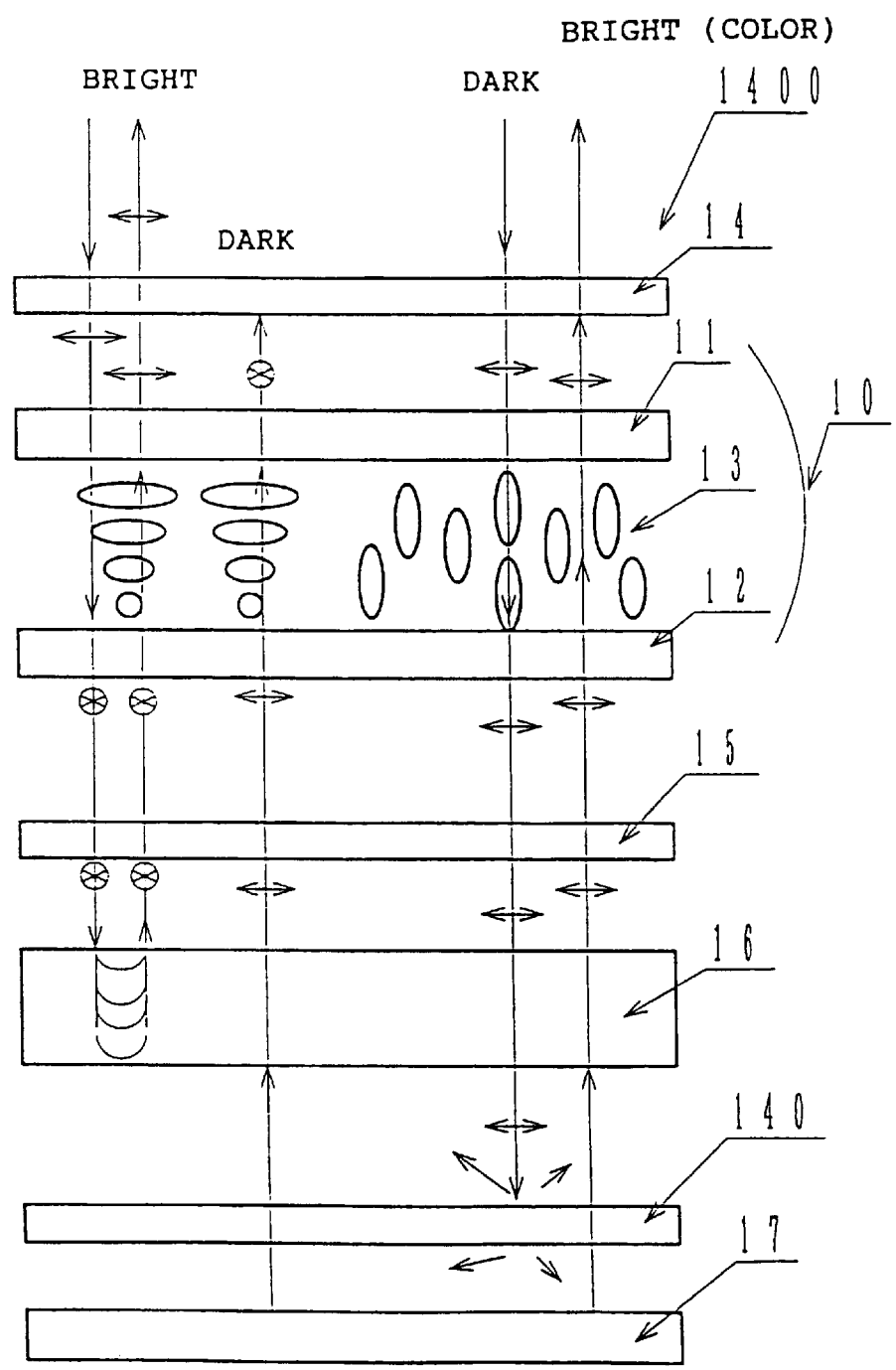
FIG. 15 is a schematic sectional view illustrating the principle of display of the display device in accordance with the fifth embodiment of the present invention.

FIG. 14 is a sectional view of a display device in the fifth embodiment of the present invention, and FIG. 15 is a schematic sectional view illustrating the principle of display of the display device in fifth embodiment of the invention.

The display device 1400 of this embodiment is a reflective display device with a so-called transflective function, which is capable of not only a reflective display using reflection of external light in a place with external light, but also a transmissive display using light from a light source 17 in a place without external light.

Basic Structure

The structure of the display device of this embodiment is described with reference to FIG. 14. In the display device 1400 of this embodiment, a TN liquid crystal panel 10 is used as a polarization changing element axis optical element. In the TN liquid crystal panel 10, a TN liquid crystal 13 is held between two glass plates 11 and 12, and a plurality of character display portions (not shown in the drawing) are provided to enable character display. On the upper side of the TN liquid crystal panel 10 is provided a polarizer 14. On the lower side of the TN liquid crystal panel 10 are provided a light scattering member 15, a polarized light separator 16, a diffusion plate 140, and a light source 17 in this order. As the diffusion plate 140, a diffusion plate capable of changing the state of polarization of incident light is used. A TAB substrate (not shown in the drawing) provided with a driver IC for driving the TN liquid crystal 13 is connected to the TN liquid crystal panel 10 to form the display device.

Polarized Light Separator

In this embodiment, the same as described above in the first embodiment with reference to FIGS. 3 and 4 is used. Detailed description of the polarized light separator 16 is omitted. Of course, besides this polarized light separator 16, polarized light separators having the same function as described above include a separator comprising a cholesteric liquid crystal layer between λ/4 plates, a separator using a Brewster angle (SID 92DIGEST pp. 427–429), a separator using a hologram, and the like. These separators may be used in the display device of this embodiment.

Principle of Display

On the assumption that the right half of the display device 1400 is a voltage applied portion, and the left half thereof is a voltage unapplied portion, the principle of display by the display device 1400 is described with reference to FIG. 15.

First, a reflective display where external light is incident on the display device 1400 is described.

In the voltage unapplied portion on the left hand side, when external light is incident on the display device 1400, the external light is changed to linearly polarized light parallel to the drawing by the polarizer 14. And then the direction of polarization is rotated 90° by the TN liquid crystal 13 to form linearly polarized light perpendicular to the drawing, which is reflected by the polarized light separator 16, maintaining the state of linearly polarized light perpendicular to the drawing. The direction of polarization is rotated 90° by the TN liquid crystal 13 to form linearly polarized light parallel to the drawing, which is emitted as linearly polarized light parallel to the drawing from the polarizer 14. In this way, with no voltage applied, incident external light is reflected by the polarized light separator 16, not absorbed thereby, to obtain a bright reflective display. Since the light scattering member 15 is provided between the polarized light separator 16 and the TN liquid crystal panel 10, light reflected by the polarized light separator 16 is changed from a mirror state to a white state.

In the voltage applied portion on the right hand side, when external light is incident on the display device 1400, the external light is changed to linearly polarized light parallel to the drawing by the polarizer 14, then transmitted through the TN liquid crystal 13 without changing the direction of polarization, also transmitted through the polarized light separator 16 without changing the direction of polarization, and then scattered by the diffusion plate 140, changing the state of polarization. Most of the light scattered to the polarized light separator side by the diffusion plate 140 cannot be transmitted through the polarized light separator 16 because the state of polarization is removed, resulting in a dark display.

In this way, in a reflective display where external light is incident on the display device 1300, in the voltage unapplied portion, light reflected by the polarized light separator 16 is transmitted through the light scattering member 15 to obtain a bright display, and in the voltage applied portion, light transmitted through the polarized light separator 16 is scattered by the diffusion plate 140 with a change in the state of polarization to obtain a dark display.

With no voltage applied, since external light incident on the display device 1400 is reflected by the polarized light separator 16, not absorbed thereby, a bright display is obtained.

Next, a transmissive display by the light from the light source 17 is described.

In the voltage unapplied portion on the left hand side, light from the light source 17 is incident on the polarized light separator 16 through the diffusion plate 140, and changed to linearly polarized light parallel to the drawing by the polarized light separator 16. Then the direction of polarization is rotated 90° by the TN liquid crystal 13 to form linearly polarized light perpendicular to the drawing, which is absorbed by the polarizer 14 to obtain a dark display.

In the voltage applied portion on the right hand side, light from the light source 17 is incident on the polarized light separator 16 through the diffusion plate 140, and changed to linearly polarized light parallel to the drawing by the polarized light separator 16. The linearly polarized light is scattered by the light scattering member 15, then transmitted through the TN liquid crystal 13 without changing the direction of polarization, and also transmitted though the polarizer 14 to obtain a bright display.

In this way, in a transmissive display with the light from the light source 17, in the voltage unapplied portion, light from the light source 17 is absorbed by the polarizer 14 to obtain a dark display, and in the voltage applied portion, light from the light source 17 is transmitted through the polarizer 14 to obtain a bright display.

Therefore, the display device 1400 of this embodiment is a reflective display device with a so-called transflective function, which is capable of not only a bright reflective display using reflection of external light in a place with external light, but also a transmissive display using light from the light source 17 in a place without external light.

Light Scattering Member

As the light scattering member 15 used in the display device of this embodiment, a light scattering member 15 capable of emitting incident light with minimal change in the state of polarization is used. Since this light scattering member 15 has the function to scatter and cloud the light emitted from the light scattering member 15, a display device with a cloudy display (white display) is obtained. In contrast, removal of the light scattering member 15 from the configuration produces a display device with a glossy display. Therefore, the light scattering member 15 should be selected in accordance with application of the display device.

Light Source

In the display device of this embodiment, the various light sources 17 described in FIGS. 1 to 9 and the first embodiment can be used. The operation and advantages are the same as the first embodiment, and thus description thereof is omitted.

Sixth Embodiment

Figure 16:
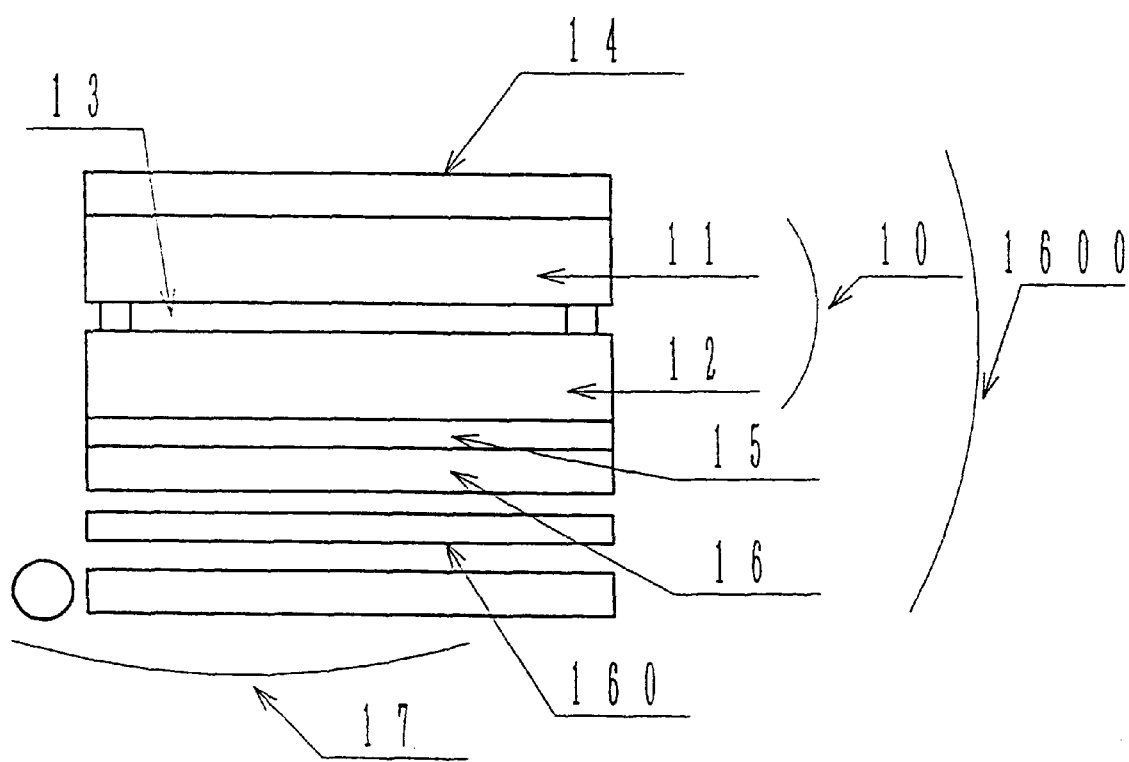
FIG. 16 is a sectional view of a display device in accordance with a sixth embodiment of the present invention.
Figure 17:
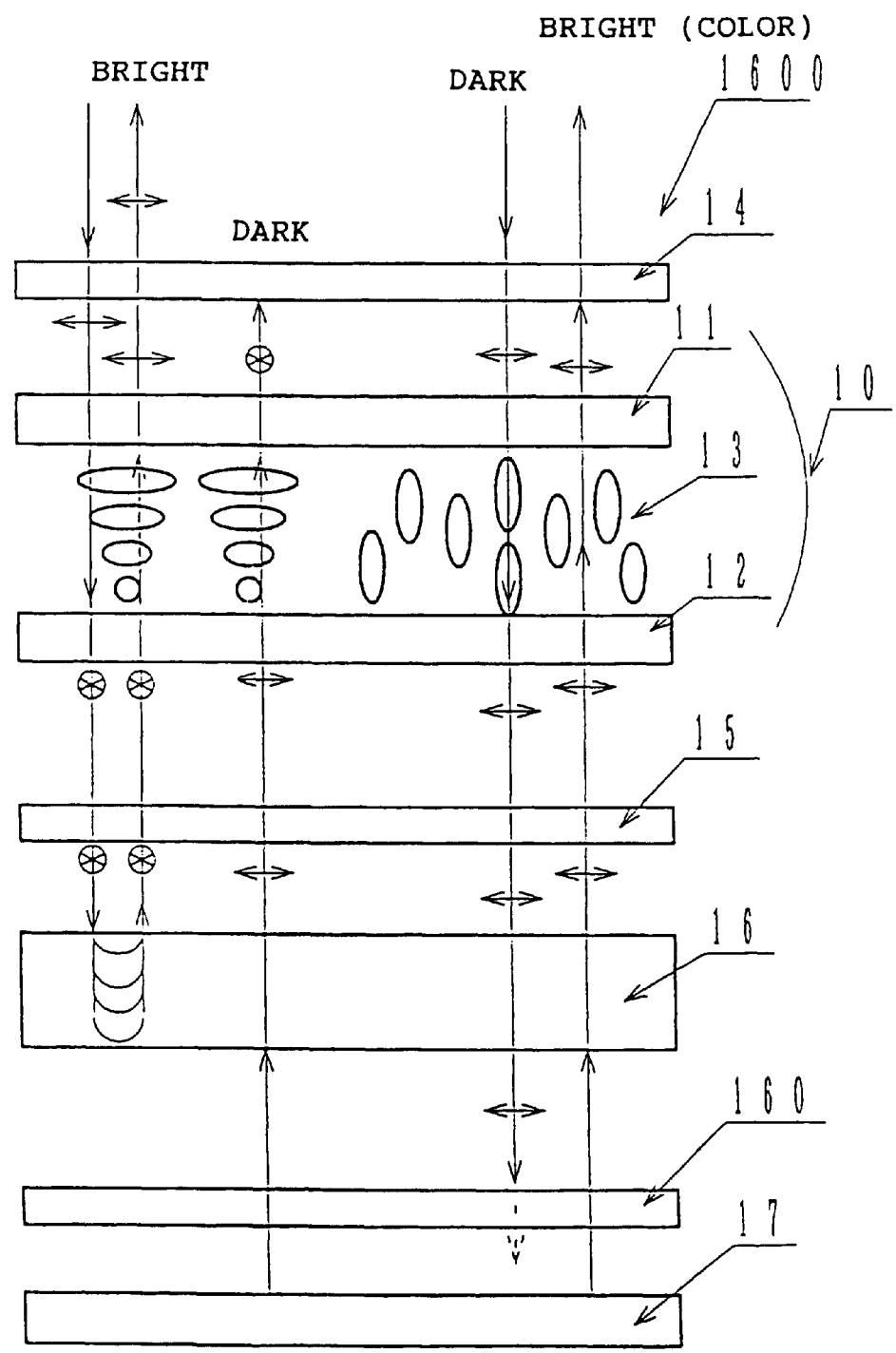
FIG. 17 is a schematic sectional view illustrating the principle of display of the display device in accordance with the sixth embodiment of the present invention.

FIG. 16 is a sectional view of a display device in accordance with a sixth embodiment of the present invention, and FIG. 17 is a schematic sectional view illustrating the principle of display of the display device in accordance with the sixth embodiment of the invention.

The display device 1600 of this embodiment is a reflective display device with a so-called transflective function, which is capable of not only a reflective display using reflection of external light in a place with external light, but also a transmissive display using light from a light source 17 in a place without external light.

Basic Structure

The structure of the display device of this embodiment is described with reference to FIG. 16. In the display device 1600 of this embodiment, a TN liquid crystal panel 10 is used as a polarization changing element axis optical element. In the TN liquid crystal panel 10, a TN liquid crystal 13 is held between two glass plates 11 and 12, and a plurality of character display portions (not shown in the drawing) are provided to enable character display. On the upper side of the TN liquid crystal panel 10 is provided a polarizer 14. On the lower side of the TN liquid crystal panel 10 are provided a light scattering member 15, a polarized light separator 16, a colored film 160 as a colored layer, and a light source 17, in this order. As the colored film, a transflective film capable of changing the state of polarization of emitted light at a predetermined wavelength, and absorbing light at wavelengths other than the above wavelength is used. As the light source 17, a cold cathode tube which is a white light source 17 is used. In order to drive the TN liquid crystal 13, a TAB substrate (not shown in the drawing) provided with a driver IC is connected to the TN liquid crystal panel 10 to form the display device.

Polarized Light Separator

In this embodiment, the same polarized light separator 16 as described above in the first embodiment with reference to FIGS. 3 and 4 is used. Detailed description of the polarized light separator 16 is omitted. Of course, besides this polarized light separator, polarized light separators having the same function as described above include a separator comprising a cholesteric liquid crystal layer between $\lambda/4$ plates, a separator using a Brewster angle (SID 92DIGEST pp. 427–429), a separator using a hologram, and the like. These separators may be used in the display device of this embodiment.

Principle of Display

On the assumption that the right half of the display device 1600 is a voltage applied portion, and the left half thereof is a voltage unapplied portion, the principle of display by the display device 1600 is described with reference to FIG. 17.

First, a reflective display where external light is incident on the display device 1600 is described.

In the voltage unapplied portion on the left hand side, when external light is incident on the display device 1600, the external light is changed to linearly polarized light parallel to the drawing by the polarizer 14. Then the direction of polarization is rotated 90° by the TN liquid crystal 13 to form linearly polarized light perpendicular to the drawing, which is reflected by the polarized light separator 16, remaining in the state of the linearly polarized light perpendicular to the drawing. The direction of polarization is rotated 90° by the TN liquid crystal 13 to form linearly polarized light parallel to the drawing, which is emitted as linearly polarized light parallel to the drawing from the polarizer 14. In this way, with no voltage applied, incident external light is reflected by the polarized light separator 16, not absorbed thereby, to obtain a bright reflective display. Since the light scattering member 15 is provided between the polarized light separator 16 and the TN liquid crystal panel 10, light reflected by the polarized light separator 16 is changed from a mirror state to a white state.

In the voltage applied portion on the right hand side, when external light is incident on the display device 1600, the external light is changed to linearly polarized light parallel to the drawing by the polarizer 14, then transmitted through the TN liquid crystal 13 without changing the direction of polarization, and also transmitted through the polarized light separator 16 without changing the direction of polarization. Then, light in the predetermined wavelength range is absorbed by the colored film 160. Since light in the predetermined wavelength range is absorbed by the colored film 160, a dark display is obtained.

In this way, in a reflective display where external light is incident on the display device 1600, in the voltage unapplied portion, light reflected by the polarized light separator 16 is transmitted through the light scattering member 15 to obtain a bright display, and in the voltage applied portion, light transmitted through the polarized light separator 16 is absorbed by the colored film 160 to obtain a dark display.

With no voltage applied, since external light incident on the display device 1600 is reflected by the polarized separator, not absorbed thereby, a bright display is obtained.

Next, a transmissive display with the light from the light source 17 is described.

In the voltage unapplied portion on the left hand side, light from the light source 17 is incident on the polarized light separator 16 through the colored film 160, and changed to linearly polarized light parallel to the drawing by the polarized light separator 16. Then the direction of polarization is rotated 90° by the TN liquid crystal 13 to form linearly polarized light perpendicular to the drawing, which is absorbed by the polarizer 14 to obtain a dark display.

In the voltage applied portion on the right hand side, light from the light source 17 is incident on the polarized light separator 16 while being colored by passing through the colored film 160, and changed to linearly polarized light parallel to the drawing by the polarized light separator 16. The linearly polarized light is scattered by the light scattering member 15, then transmitted through the TN liquid crystal 13 without changing the direction of polarization, and also transmitted through the polarizer 14 to obtain a bright display.

In this way, in a transmissive display with the light from the light source 17, in the voltage unapplied portion, light from the light source 17 is absorbed by the polarizer 14 to obtain a dark display, and in the voltage applied portion, light from the light source 17 is transmitted through the polarizer 14 to obtain a bright display.

Therefore, the display device 1600 of this embodiment is a reflective display device with a so-called transflective function, which is capable of not only a bright reflective display using reflection of external light in a place with external light, but also a transmissive display using light from the light source 17 in a place without external light.

Light Scattering Member

As the light scattering member 15 used in the display device of this embodiment, a light scattering member 15 capable of emitting incident light with minimal change in the state of polarization is used. Since this light scattering member 15 has the function to scatter and cloud the light emitted from the light scattering member 15, a display device with a cloudy display (white display) is obtained. In contrast, removal of the light scattering member 15 from the configuration produces a display device with a glossy display. Therefore, the light scattering member 15 should be selected in accordance with application of the display device.

Colored Layer

Figure 18:
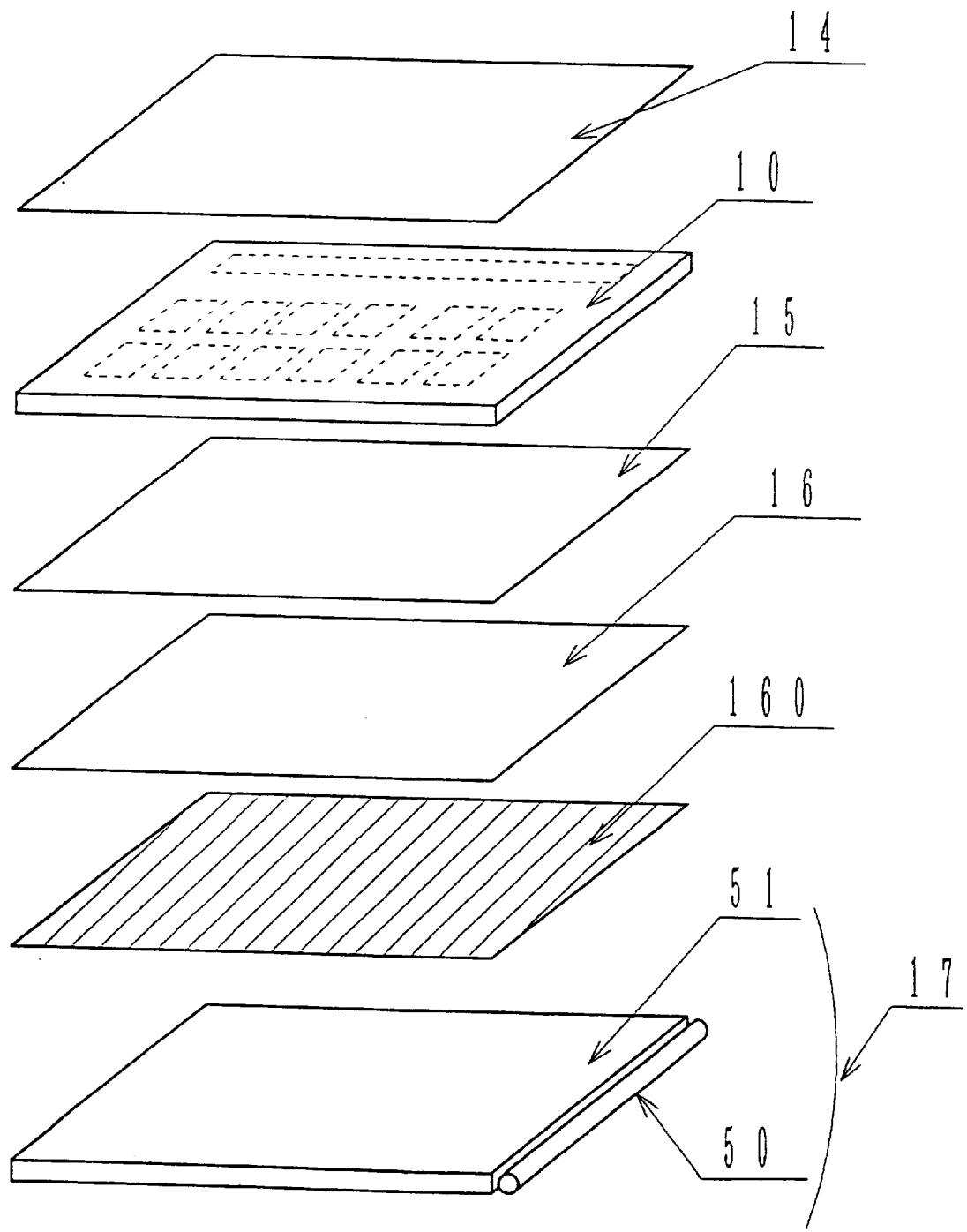
FIG. 18 is a drawing illustrating an example of a colored layer used in the present invention.
Figure 19:
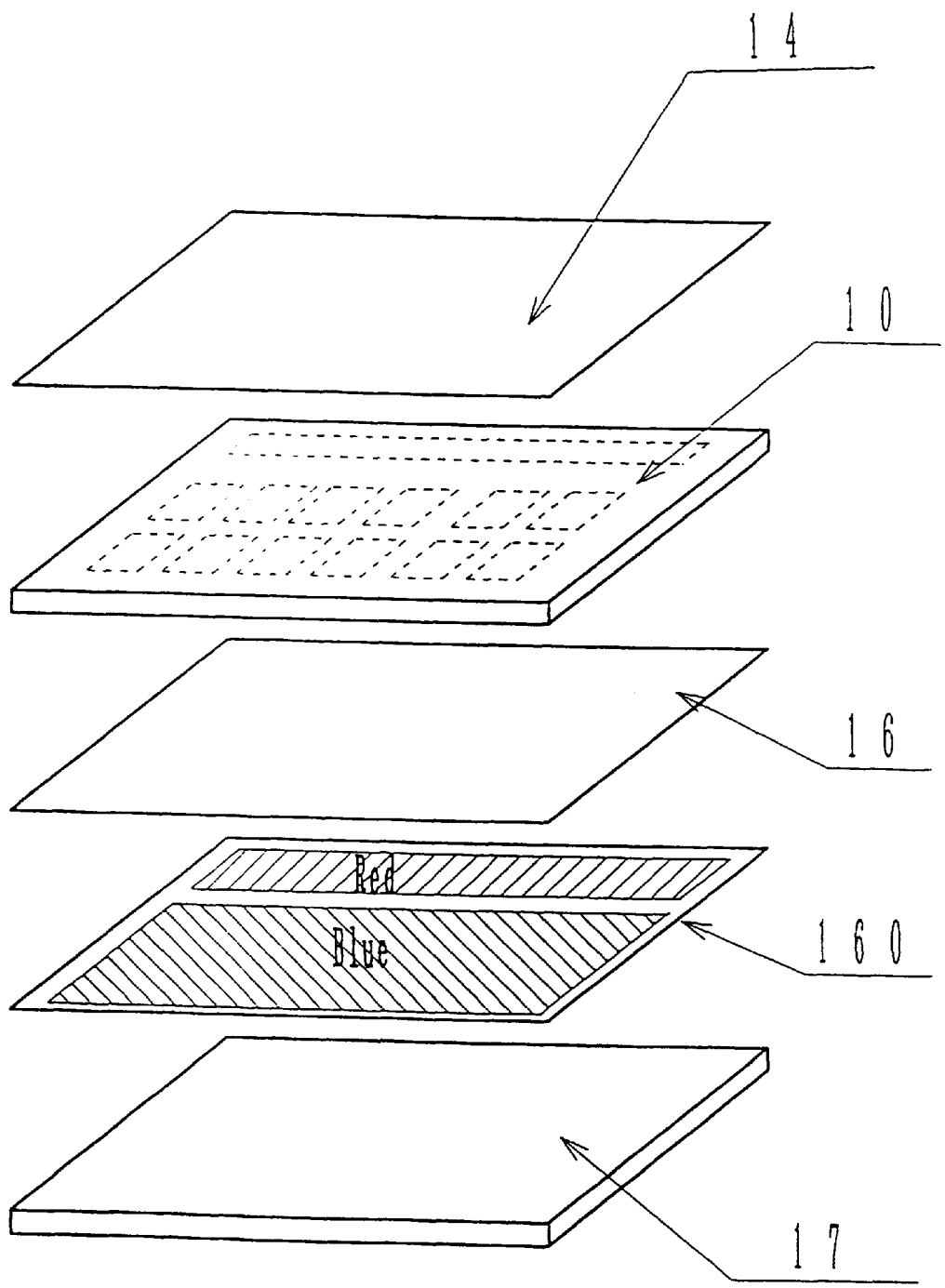
FIG. 19 is a drawing illustrating another example of a colored layer used in the present invention.

FIGS. 18 and 19 respectively show display devices comprising various colored films 160 as the colored layer in accordance with this embodiment. In this embodiment, any one of the colored films 160 shown in FIGS. 18 and 19 can be used.

In the display device shown in FIG. 18, a colored film 160 which transmits and reflects light at the wavelength of red is used. In the display device shown in FIG. 18, as a reflective display, a blackish red display is obtained in the voltage applied portion and a white display is obtained in the voltage unapplied portion, respectively. On the other hand, as a transmissive display with the light from the light source 17, a display having the color of light emitted from the light source 17 and colored by the colored film 160, i.e., a red display, is obtained in the voltage applied portion, and a black display is obtained in the voltage unapplied portion.

Where the colored film 160 is not used, but a light source 17 emitting white light is used for the light from the light source 17, a dark display is obtained in the voltage unapplied portion and a bright display is obtained in the voltage applied portion, respectively, to obtain a transmissive display, as described above. In this case, when external light is incident on the front side of the display device, due to the external light, a bright display is obtained in the voltage unapplied portion and a dark display is obtained in the voltage applied portion, respectively. As a result, in both the voltage unapplied portion and the voltage applied portion, for example, when a display by transmitted light from the light source 17 is a bright display, a gray display is obtained due to addition of the reflective dark display by external light, and when a display by transmitted light from the light source 17 is a dark display, a gray display is obtained due to addition of the reflective bright display by external light. Therefore, so-called positive-negative reversal occurs, and sometimes makes the display hard to see.

When the light source 17 is turned on by using the colored film 160 shown in FIG. 18 at incidence of external light, the light emitted from the light source 17 and transmitted through the colored film 160 is seen in the voltage applied portion to obtain a grayish red display, and external light reflected by the polarized light separator 16 is seen in the voltage unapplied portion to obtain a gray display, thereby making the display significantly easy to see as compared with black-and-white display.

Although the colored filter which reflects or transmits light at the wavelength of red is used in FIG. 18, of course, light at the wavelength of a color other than red may be used.

In the display device shown in FIG. 19, a colored film 160 having a region which reflects or transmits light at the wavelength of red and a region which reflects or transmits light at the wavelength of blue is provided as the colored layer. These regions are arranged so that emitted light corresponds to each of the character display portions formed in the liquid crystal panel 10. When using the colored film 160 shown in FIG. 19 in the display device of this embodiment, in a reflective display, a black display is obtained in the voltage applied portion and a white display is obtained in the voltage unapplied portion, respectively. On the other hand, as for a transmissive display with the light from the light source 17, a display having the color of the light emitted from each of the regions of the colored film 160, i.e., a red or blue display, is obtained at the corresponding character display portion in the voltage applied portion, and a black display is obtained in the voltage unapplied portion. When the light source 17 shown in FIG. 19 is turned on at incidence of external light, the light emitted from each of the LED groups is seen, causing a grayish red or blue display at each of the character display portions in the voltage applied portion, and external light reflected by the polarized light separator 16 is seen, causing a gray display in the voltage unapplied portion. Although the colored film 160 which transmits or reflects light at the wavelength of red and the colored film 160 which transmits or reflects light at the wavelength of blue are used in FIG. 19, of course, a colored film which reflects or transmits light at the wavelength of a color other than these colors may be used, and combinations of colored films can appropriately be selected.

Seventh Embodiment

Figure 20:
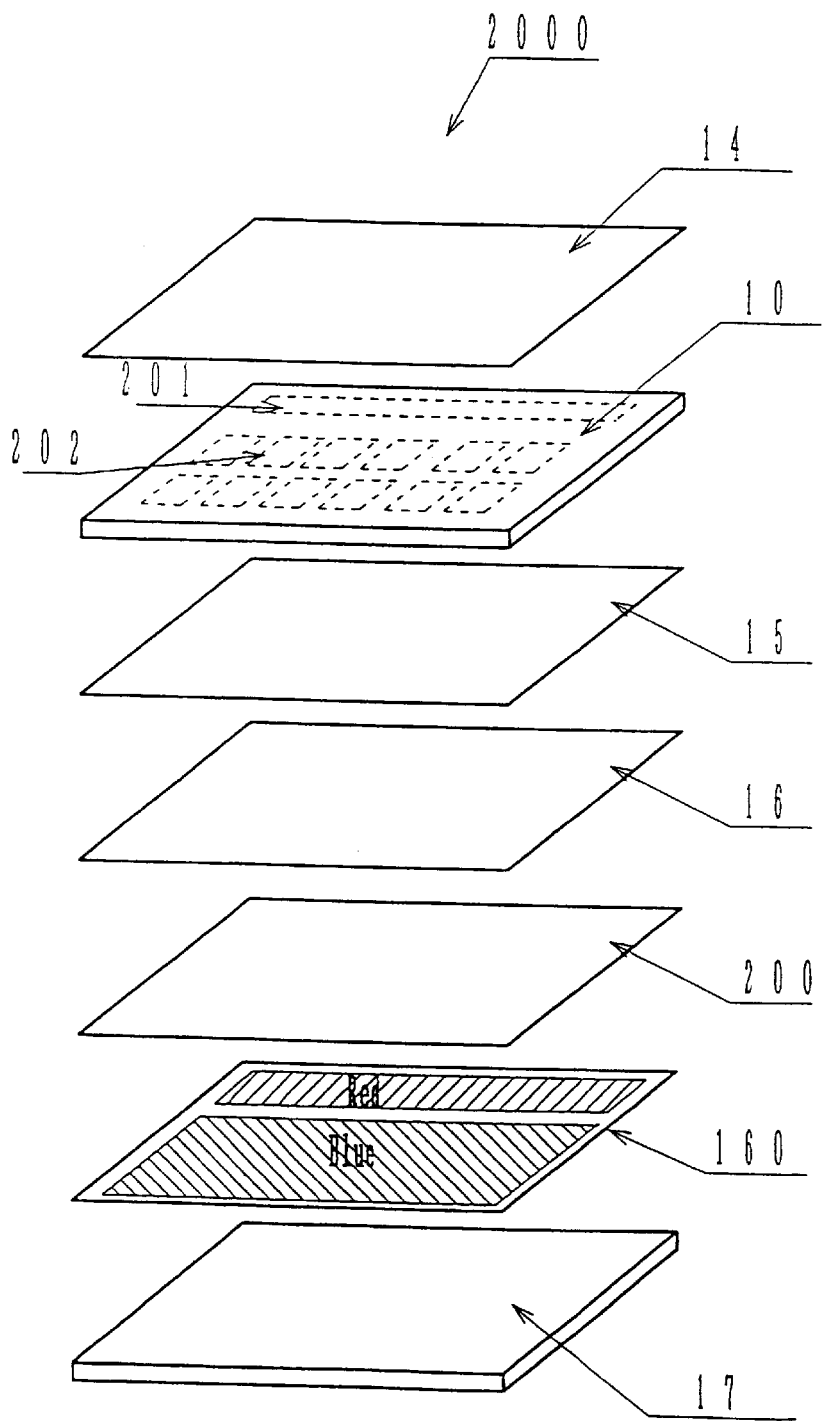
FIG. 20 is a sectional view of a display device in accordance with a seventh embodiment of the present invention.
Figure 21:
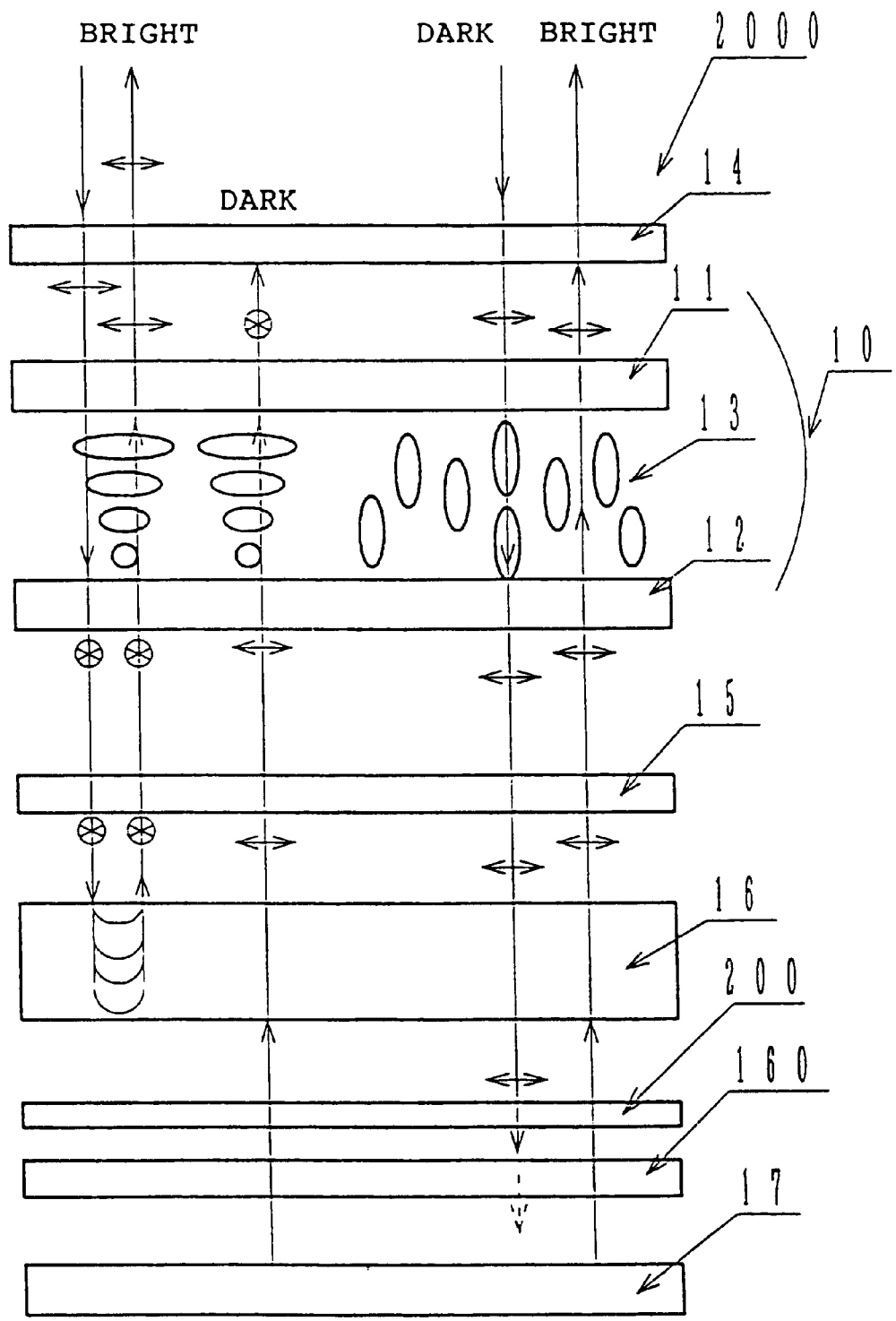
FIG. 21 is a schematic sectional view illustrating the principle of display of the display device in accordance with the seventh embodiment of the present invention.

FIG. 20 is a sectional view of a display device in accordance with a seventh embodiment of the present invention, and FIG. 21 is a schematic sectional view illustrating the principle of display of the display device in accordance with the seventh embodiment of the invention.

The display device 2000 of this embodiment is a reflective display device with a so-called transflective function, which is capable of not only a reflective display using reflection of external light at a place with external light, but also a transmissive display using light from a light source 17 at a place without external light.

Basic Structure

The structure of the display device of this embodiment is described with reference to FIG. 20. In the display device 2000 of this embodiment, a TN liquid crystal panel 10 is used as a polarization changing element axis optical element. In the TN liquid crystal panel 10, a TN liquid crystal is held between two glass plates, and a plurality of character display portions 201 and 202 are provided to enable character display. On the upper side of the TN liquid crystal panel 10 is provided a polarizer 14. On the lower side of the TN liquid crystal panel 10 are provided a light scattering member 15, a polarized light separator 16, a light absorber 200 in a gray translucent state, a colored film 160 as a colored layer, and a light source 17 in this order. In order to drive the TN liquid crystal 13, a TAB substrate (not shown in the drawing) provided with a driver IC is connected to the TN liquid crystal panel 10 to form the display device.

Polarized Light Separator

In this embodiment, the same polarized light separator 16 as described above in the first embodiment with reference to FIGS. 3 and 4 is used. Detailed description of the polarized light separator 16 is omitted. Of course, besides this polarized light separator 16, polarized light separators having the same function as described above include a separator comprising a cholesteric liquid crystal layer between λ/4 plates, a separator using a Brewster angle (SID 92DIGEST pp. 427–429), a separator using a hologram, and the like. These separators may be used in the display device of this embodiment.

Principle of Display

On the assumption that the right half of the display device 2000 is a voltage applied portion, and the left half thereof is a voltage unapplied portion, the principle of display by the display device 2000 is described with reference to FIG. 21.

First, a reflective display where external light is incident on the display device 2000 is described.

In the voltage unapplied portion on the left hand side, when external light is incident on the display device 2000, the external light is changed to linearly polarized light parallel to the drawing by the polarizer 14. Then the direction of polarization is rotated 90° by the TN liquid crystal 13 to form linearly polarized light perpendicular to the drawing, which is reflected by the polarized light separator 16, and maintains the state of the linearly polarized light perpendicular to the drawing. The direction of polarization is rotated 90° by the TN liquid crystal 13 to form linearly polarized light parallel to the drawing, which is emitted as linearly polarized light parallel to the drawing from the polarizer 14. In this way, with no voltage applied, incident external light is reflected by the polarized light separator 16, not absorbed thereby, to obtain a bright reflective display. Since the light scattering member 15 is provided between the polarized light separator 16 and the TN liquid crystal panel 10, light reflected by the polarized light separator 16 is changed from a mirror state to a white state.

In the voltage applied portion on the right hand side, when external light is incident on the display device 2000, the external light is changed to linearly polarized light parallel to the drawing by the polarizer 14, then transmitted through the TN liquid crystal 13 without changing the direction of polarization, and also transmitted through the polarized light separator 16 without changing the direction of polarization. Then, the light is absorbed by the light absorber 200 in a gray translucent state to obtain a dark display.

In this way, in a reflective display where external light is incident on the display device 2000, in the voltage unapplied portion, light reflected by the polarized light separator 16 is transmitted through the light scattering member 15 to obtain a bright display, and in the voltage applied portion, light transmitted through the polarized light separator 16 is absorbed by the light absorber 200 in a gray translucent state to obtain a dark display.

With no voltage applied, since external light incident on the display device 2000 is reflected by the polarized light separator 16, not absorbed thereby, bright display is obtained.

Next, a transmissive display by the light from the light source 17 is described.

In the voltage unapplied portion on the left hand side, light from the light source 17 passes through the colored film 160 and the light absorber 200 in a transflective state, and is incident on the polarized light separator 16. The light is changed to linearly polarized light parallel to the drawing by the polarized light separator 16. Then the direction of polarization is rotated 90° by the TN liquid crystal 13 to form linearly polarized light perpendicular to the drawing, which is absorbed by the polarizer 14 to obtain a dark display.

In the voltage applied portion on the right hand side, light from the light source 17 is transmitted through the light absorber 200 in a transflective state, is incident on the polarized light separator 16 while being colored by passing through the colored film 160, and is changed to linearly polarized light parallel to the drawing by the polarized light separator 16. The linearly polarized light is scattered by the light scattering member 15, then transmitted through the TN liquid crystal 13 without changing the direction of polarization, and also transmitted through the polarizer 14 to obtain a bright display.

In this way, in a transmissive display with the light from the light source 17, in the voltage unapplied portion, light from the light source 17 is absorbed by the polarizer 14 to obtain a dark display, and in the voltage applied portion, light from the light source 17 is transmitted through the polarizer 14 to obtain a bright display.

Therefore, the display device 2000 of this embodiment is a reflective display device with a so-called transflective function, which is capable of not only a bright reflective display using reflection of external light at a place with external light, but also a transmissive display using light from the light source 17 at a place without external light.

Light Absorber

In this embodiment, besides the light absorber 200 in a translucent state, the same light absorber 102 as used in the second embodiment, i.e., the black light absorber 102 having openings 103, can also be used as the light absorber 200. By limiting the area ratio of the openings 103 to the light absorber 200, a decrease in contrast can be suppressed as described in the second embodiment. Of course, like in the second embodiment, a polarizer having an absorption axis shifted from the reflection axis of the polarized light separator 16 can also be used.

Colored Layer

In the display device of this embodiment, the colored films 160 described in FIGS. 18 and 19 and the sixth embodiment can be used as a colored layer 160. The operation and advantage of the colored layer 160 are the same as the sixth embodiment, and thus description thereof is omitted.

Eighth Embodiment

Figure 22:
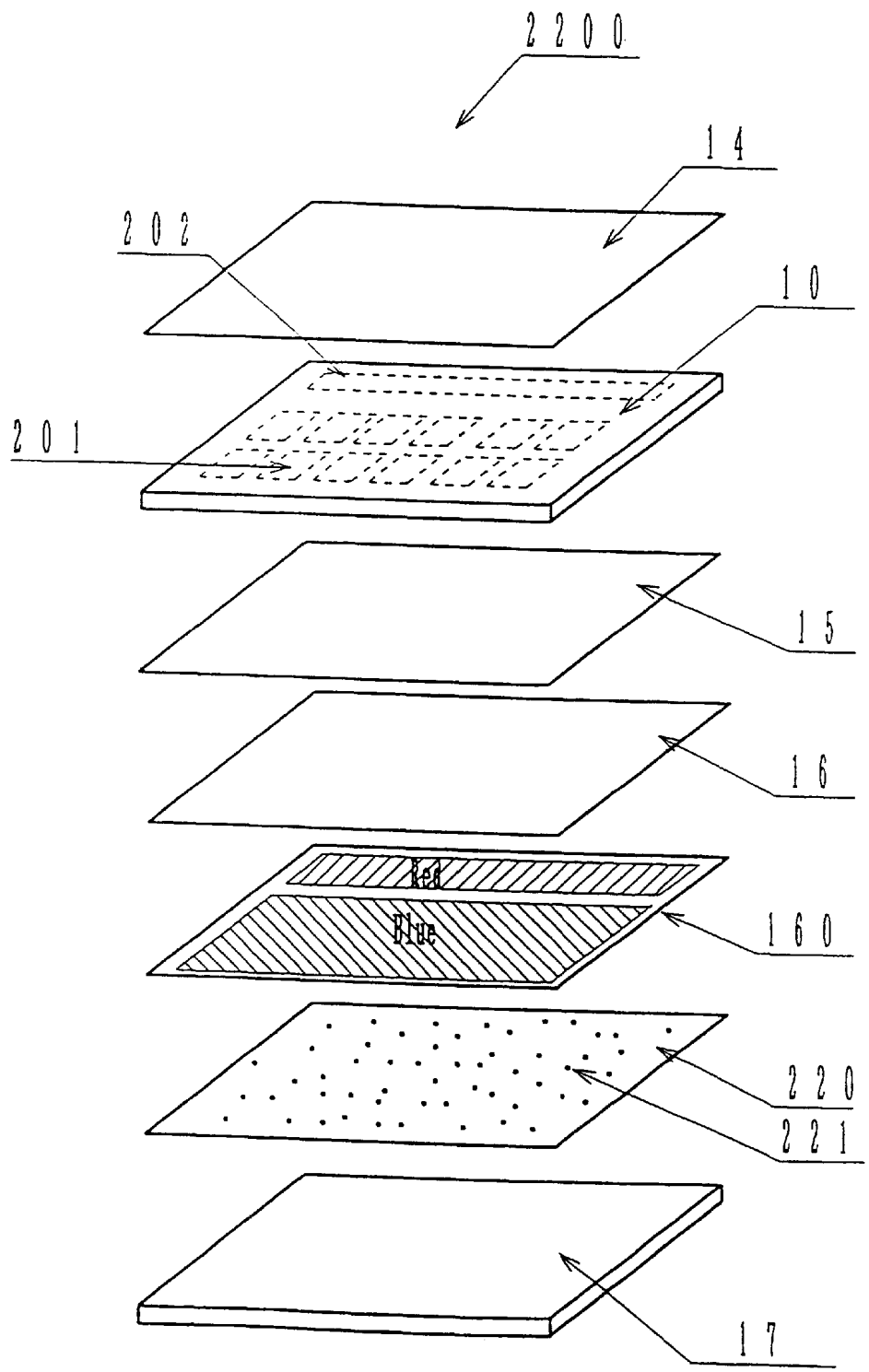
FIG. 22 is a sectional view of a display device in accordance with an eighth embodiment of the present invention.
Figure 23:
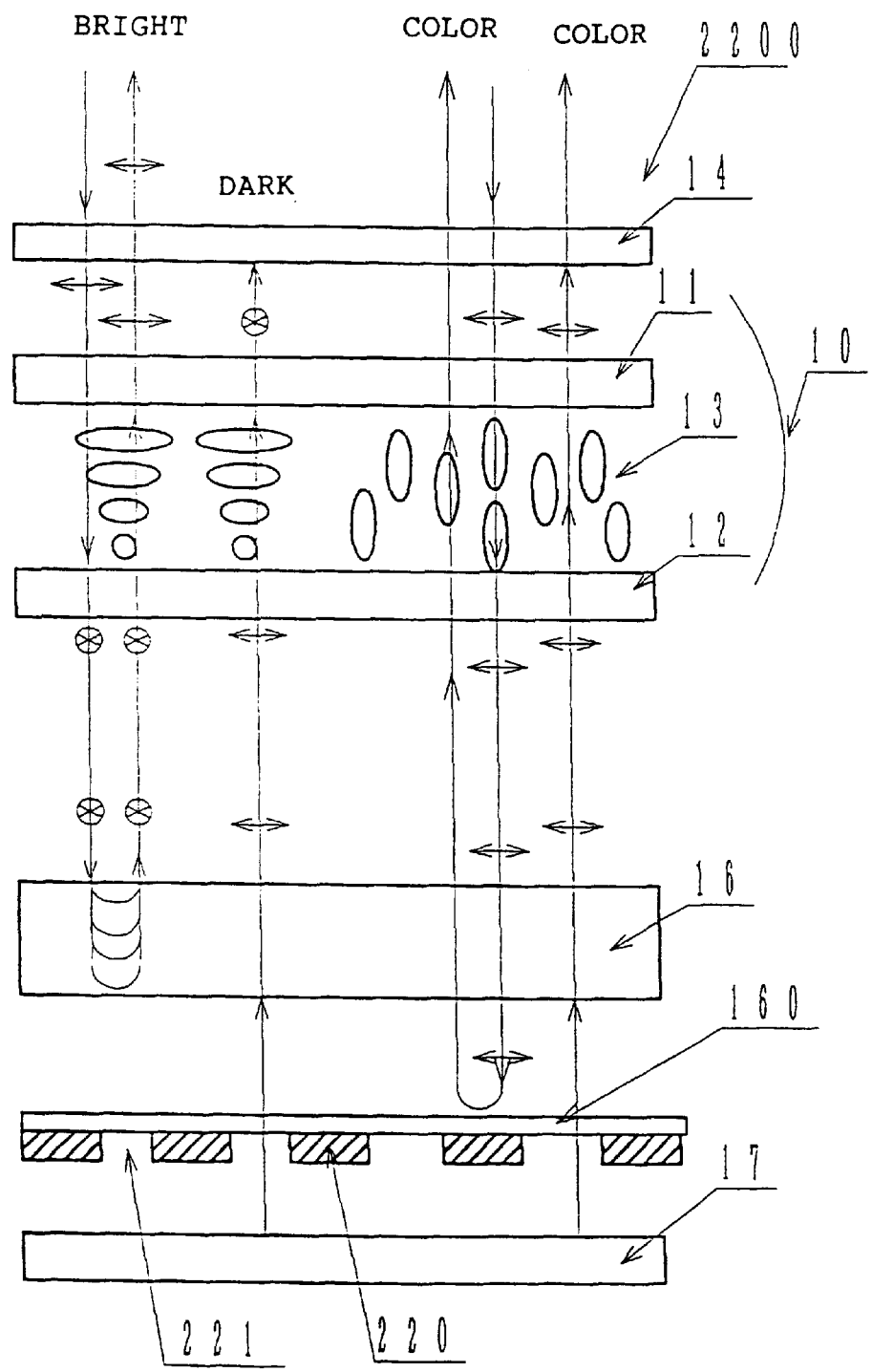
FIG. 23 is a schematic sectional view illustrating the principle of display of the display device in accordance with the eighth embodiment of the present invention.

FIG. 22 is a sectional view of a display device in accordance with an eighth embodiment of the present invention, and FIG. 23 is a schematic sectional view illustrating the principle of display of the display device in accordance with the eighth embodiment of the invention.

The display device 2200 of this embodiment is a reflective display device with a so-called transflective function, which is capable of not only a reflective display using reflection of external light at a place with external light, but also a transmissive display using light from a light source 17 at a place without external light.

Basic Structure

The structure of the display device of this embodiment is described with reference to FIG. 22. In the display device 2200 of this embodiment, a TN liquid crystal panel 10 is used as a polarization changing element axis optical element. In the TN liquid crystal panel 10, a TN liquid crystal is held between two glass plates, and a plurality of character display portions 201 and 202 are provided to enable character display. On the upper side of the TN liquid crystal panel 10 is provided a polarizer 14. On the lower side of the TN liquid crystal panel 10 are provided a polarized light separator 16, a colored film 160 as a colored layer, a reflecting plate 220 having openings 221, and a light source 17 in this order. In the reflecting plate 220 are provided a plurality of openings 221 at a predetermined area ratio. In order to drive the TN liquid crystal 13, a TAB substrate (not shown in the drawing) provided with a driver IC is connected to the TN liquid crystal panel 10 to form the display device.

Polarized Light Separator

In this embodiment, the same polarized light separator 16 as described above in the first embodiment with reference to FIGS. 3 and 4 is used. Detailed description of the polarized light separator 16 is omitted. Of course, besides this polarized light separator 16, polarized light separators having the same function as described above include a separator comprising a cholesteric liquid crystal layer between λ/4 plates, a separator using a Brewster angle (SID 92DIGEST pp. 427–429), a separator using a hologram, and the like. These separators may be used in the display device of this embodiment.

Principle of Display

On the assumption that the right half of the display device 2200 is a voltage applied portion, and the left half thereof is a voltage unapplied portion, the principle of display by the display device 2200 is described with reference to FIG. 23.

First, a reflective display where external light is incident on the display device 2200 is described.

In the voltage unapplied portion on the left hand side, when external light is incident on the display device 2200, the external light is changed to linearly polarized light parallel to the drawing by the polarizer 14. Then the direction of polarization is rotated 90° by the TN liquid crystal 13 to form linearly polarized light perpendicular to the drawing, which is reflected by the polarized light separator 16, and maintains the state of the linearly polarized light perpendicular to the drawing. The direction of polarization is rotated 90° by the TN liquid crystal 13 to form linearly polarized light parallel to the drawing, which is emitted as linearly polarized light parallel to the drawing from the polarizer 14. In this way, with no voltage applied, incident external light is reflected by the polarized light separator 16, not absorbed thereby, to obtain a bright reflective display.

In the voltage applied portion on the right hand side, when external light is incident on the display device 2200, the external light is changed to linearly polarized light parallel to the drawing by the polarizer 14, then transmitted through the TN liquid crystal 13 without changing the direction of polarization, and also transmitted through the polarized light separator 16 without changing the direction of polarization. Part of the light is reflected by the colored layer 160, again transmitted through the polarized light separator 16, transmitted as linearly polarized light parallel to the drawing through the TN liquid crystal 13, and emitted as linearly polarized light parallel to the drawing from the polarizer 14. Part of the light emitted from the polarized light separator 16 is transmitted through the colored layer 160 while being absorbed thereby, reflected by the reflecting plate 220, and again transmitted through the colored layer 160 while being absorbed thereby. Then the light is again transmitted through the polarized light separator 16, and transmitted as linearly polarized light parallel to the drawing through the TN liquid crystal 13 without changing the direction of polarization, and emitted as linearly polarized light parallel to the drawing from the polarizer 14 to obtain a color display.

Next, a transmissive display with the light from the light source 17 is described.

In the voltage unapplied portion on the left hand side, light from the light source 17 is incident on the polarized light separator 16 while being colored by the colored film 160 through the openings 221 provided in the reflecting plate 220. The light is changed to linearly polarized light parallel to the drawing by the polarized light separator 16. Then the direction of polarization is rotated 90° by the TN liquid crystal 13 to form linearly polarized light perpendicular to the drawing, which is absorbed by the polarizer 14 to obtain a dark display.

In the voltage applied portion on the right hand side, light from the light source 17 passes through the openings 103 221 provided in the reflecting plate 220, is incident on the polarized light separator 16 while being colored by passing through the colored film 160, and changed to linearly polarized light parallel to the drawing by the polarized light separator 16. The linearly polarized light is transmitted through the TN liquid crystal 13 without changing the direction of polarization, and also transmitted through the polarizer 14 to obtain a bright display.

In this way, in a transmissive display with the light from the light source 17, in the voltage unapplied portion, light from the light source 17 is absorbed by the polarizer 14 to obtain a dark display, and in the voltage applied portion, light from the light source 17 is transmitted through the polarizer 14 to obtain a bright display.

Therefore, the display device 2200 of this embodiment is a reflective display device with a so-called transflective function, which is capable of not only a bright reflective display using reflection of external light at a place with external light, but also a transmissive display sing light from the light source 17 at a place without external light.

Reflecting Plate

In this embodiment, an Al reflecting plate 220 or the like can be used as the reflecting plate 220. Besides the reflecting plate having the openings 221, a half mirror or the like may be used.

Colored Layer

In the display device of this embodiment, the colored films 160 described in FIGS. 18 and 19 and the sixth embodiment can be used as a colored layer. The operation and advantage of the colored layer are the same as the sixth embodiment, and thus description thereof is omitted.

Ninth Embodiment

Figure 25A:
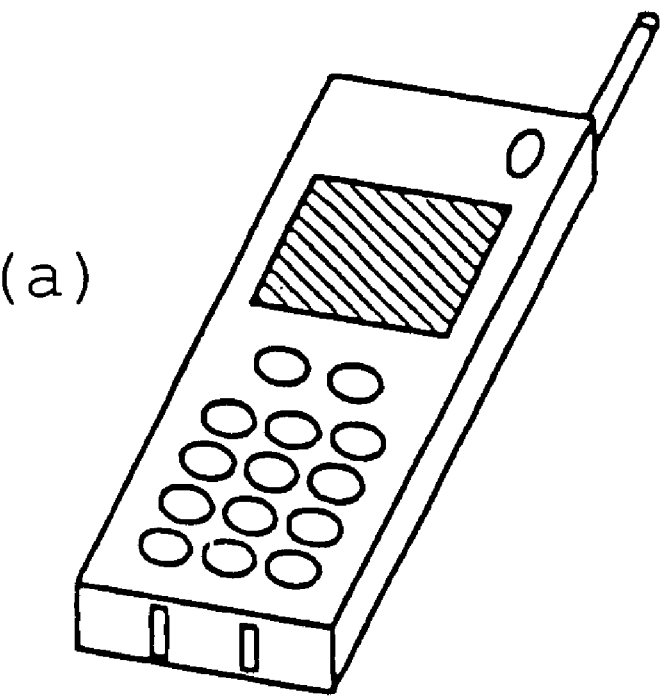
FIGS. 25(a) and 25(b) show examples of electronic apparatus comprising a display device as a display unit.
Figure 25B:
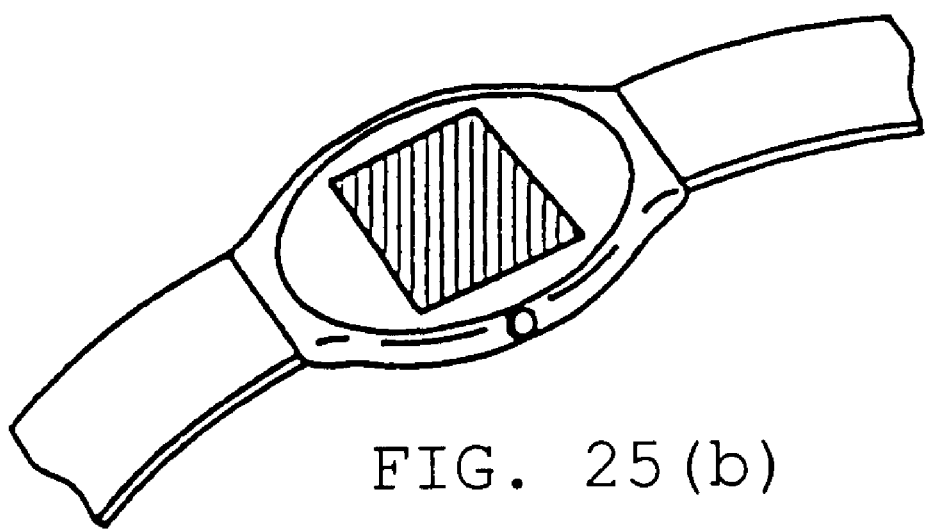
Figure 26:
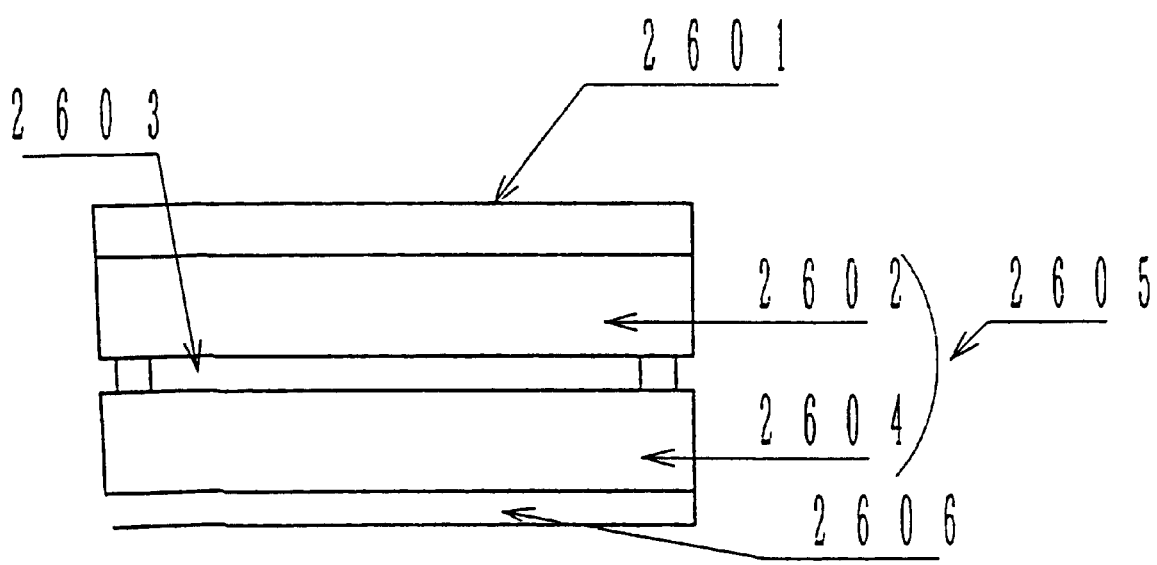
FIG. 26 is a drawing showing an example of conventional display devices.

FIG. 25 is a perspective view of a portable telephone using the display devices described in the first to eighth embodiments of the present invention as a display portion. FIG. 25(a) shows a portable telephone, and FIG. 25(b) shows a wristwatch.

Although, in this embodiment, a portable telephone and a wristwatch are shown, the display device of the present invention can be used for various electronic apparatus such as a personal computer, a car navigation, an electronic handbook, etc.

Although, in the first to ninth embodiment, only a dark display, a bright display and a color display are described, of course, the display device of each of the embodiments is capable of a half tone display.

Also, although, in the first to ninth embodiments, the TN liquid crystal panel 10 is described as an example of polarization changing element axis means, an STN liquid crystal panel, an ECB liquid crystal panel, and the like can also be used. As the STN liquid crystal panel, an STN liquid crystal panel comprising a color compensation optical anisotropic material, such as an F-STN liquid crystal panel 10 or the like, is preferably used.

In the first to ninth embodiments, preferably, the amount of the light reflected by the light source and returned can be decreased by increasing the distance between the polarized light separator 16 and the light source 17, whereby a decrease in contrast can be suppressed.

Also, in the second to fifth embodiments, and the seventh and eighth embodiments, the quantity of the light which is transmitted through the light absorber and returned by reflection from the light source can be decreased by increasing the distance between the light absorber 120 or 200 or the scattering plate 15 and the light source 17, whereby a decrease in contrast can be suppressed.

Also, in the first to eighth embodiments, reflection of the surface of the light source 17 can be suppressed by darkening the surface color of the light source 17, resulting in a decrease in the quantity of the light which is transmitted through the light absorber and returned by reflection from the light source 17, whereby a decrease in contrast can be suppressed.

In the second to fifth embodiments, and the seventh embodiment, since a bright display with the light reflected by the polarized light separator side is a display with the light reflected by the polarized light separator side, this display is not influenced by the structure of the light absorber disposed behind the polarized light separator.

The display device described in the first to fifth embodiments may further comprise means for converging light from the light source 17 to the front of the display device.

Figure 24:
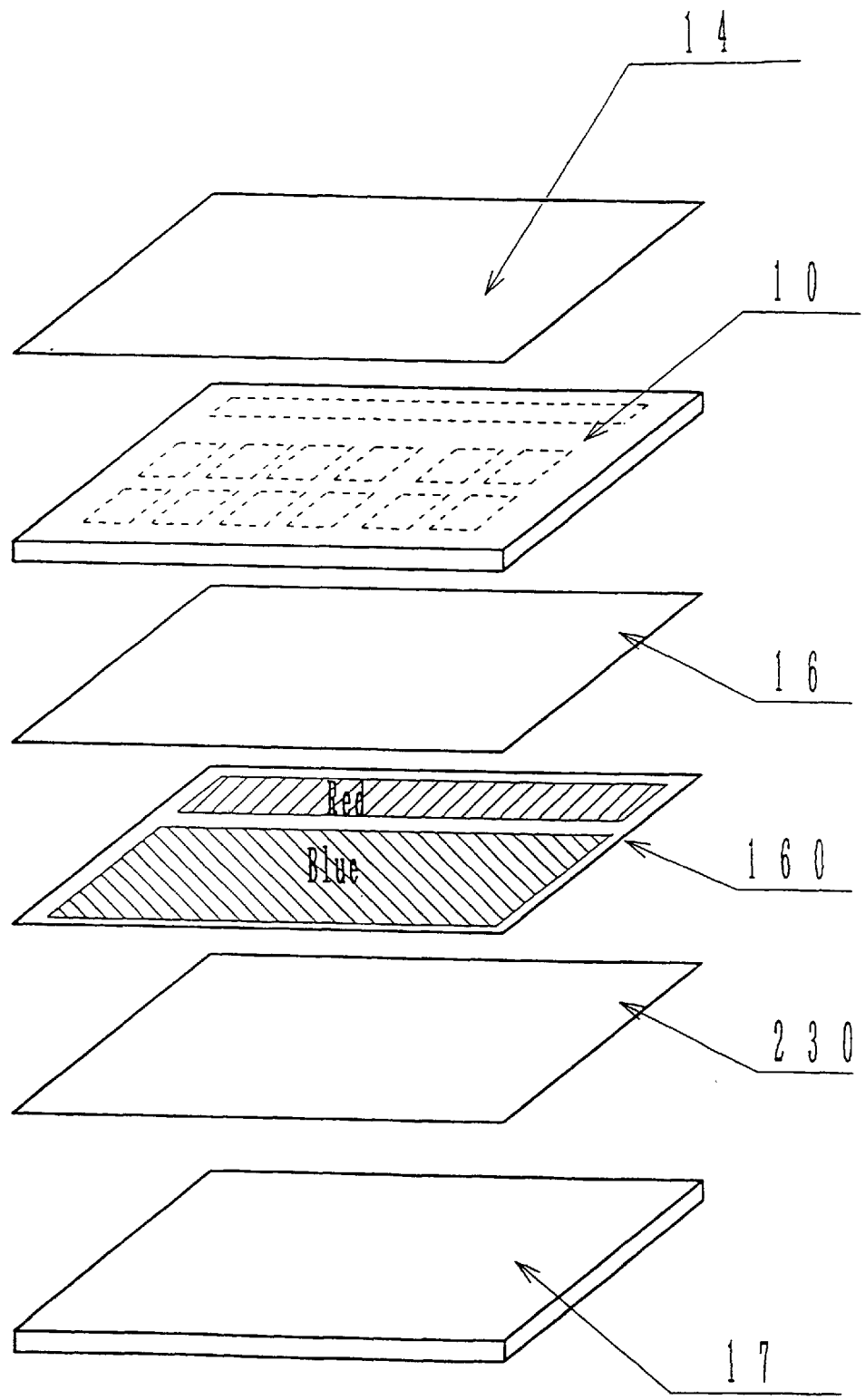
FIG. 24 is a drawing showing an example in which a prism sheet is combined with a display device of the present invention.

When a reflective display by external light is seen, the reflective display is generally seen at a position at an angle with the normal to the front of the display device. This is because if the reflective display is seen from the direction normal to the front of the display device, the external light incident on the display device is hindered by the observer, and thus the reflective display by external light is darkened. On the other hand, when a display with transmitted light from the light source is seen, the display is generally seen from the direction normal to the front of the display device. Therefore, the display with transmitted light from the light source can be brightened by providing means for converging light from the light source toward the front of the display device, thereby making the transmissive display by the light from the light source easy to see from the direction normal to the front of the display device. As means for converging light from the light source toward the front of the display device, for example, a prism sheet is preferably used. Regarding to the position where the prism sheet is provided, in the first to fifth embodiments, the prism sheet is preferably provided between the light source and the polarized light separator, and in the sixth to eighth embodiments, the prism sheet 230 is preferably provided between the light source and the colored film, as shown in FIG. 24.

In the display device of the present invention, for light incident from the outside of the first polarized light separator, the two display states, which are the first display state created by the light reflected from the second polarized light separator, and the second display state where the light transmitted through the second polarized light separator is absorbed by the optical element, are obtained according to the state of the transmission polarization axis of the variable transmission polarization axis means, to form a reflective display device. Since the first display state is a display state created by the light reflected from the second polarized light separator, a bright display is obtained.

Also, for light from the light source, the two display states, which are the third display state created by the light transmitted through the first polarized light separator, and the fourth display state where no light is transmitted through the first polarized light separator, are obtained according to the state of the transmission polarization axis of the variable transmission polarization axis means, to obtain a transmissive display.

In this way, the display device of the present invention is capable of not only a bright reflective display using reflection of external light at a place with external light, but also a transmissive display using light from the light source at a place without external light.

The second polarized light separator is polarized light separator in which for light over substantially the entire wavelength range of the visible light spectrum, of light incident on the variable transmission polarization axis means side, a linearly polarized light component in the third predetermined direction is transmitted to the optical element side, and a linearly polarized light component in the fourth predetermined direction perpendicular to the third predetermined direction is reflected to the variable transmission polarization axis means side, and for light over substantially the entire wavelength range of the visible light spectrum and incident on the optical element side, linearly polarized light in the third predetermined direction can be emitted to the variable transmission polarization axis means side. As a result, the first to fourth display states for light over the entire wavelength range of the visible light spectrum can be obtained, and a transparent or bright display can be obtained in the first and third display states.

The optical element mentioned above is an optical element which absorbs light over substantially the entire wavelength range of the visible light spectrum, particularly is a black light absorber, whereby a dark display can be obtained in the second and fourth display states.

What is claimed is:

1. A display device, comprising:
   a polarization changing element that changes a transmission polarization axis;
   a first polarized light separator and a second polarized light separator disposed on opposite sides of the polarization changing element;
   a light absorber that substantially absorbs external light; and a light source disposed on a side of the second polarized light separator opposite the polarization changing element that emits colored light, the first polarized light separator transmitting a linearly polarized light component in a first predetermined direction, the first polarized light separator not transmitting a linearly polarized light component in a second direction different from the first direction, and the second polarized light separator transmitting a linearly polarized light component in a third predetermined direction and reflecting a linearly polarized light component in a fourth predetermined direction different from the third predetermined direction.

2. The display device according to claim 1, the first polarized light separator comprising a polarizer.

3. The display device according to claim 1, the polarization changing element comprising a liquid crystal element.

4. The display device according to claim 3, the polarization changing element comprising one of a TN liquid crystal element, an STN liquid crystal element, an F-STN liquid crystal element and an ECB liquid crystal element.

5. The display device according to claim 1, the light source comprising at least one EL element that emits light in a predetermined wavelength region.

6. The display device according to claim 5, the light source comprising:

a first EL element that emits light in a third predetermined wavelength region, and a second EL element that emits light in a fourth predetermined wavelength region different from the third predetermined wavelength region.

7. The display device according to claim 1, a color of display with the light from the light source is different from a color of display with incident light from a polarizer side.

8. A display device, comprising:

a liquid crystal panel that changes a polarization transmission polarization axis;

a polarizer disposed on one side of the liquid crystal panel;

a reflective polarizer disposed on a side opposite to the polarizer with respect to the liquid crystal panel;

a light absorber that substantially absorbs external light; and a light source, disposed on a side opposite to the liquid crystal panel with respect to the reflective polarizer, that emits colored light, the light source comprising a first light element that emits light in a first predetermined wavelength region, and a second a first light element that emits light in a second predetermined wavelength region different from the first predetermined wavelength region.

9. The display device according to claim 8, the first light element comprising a first LED that emits light in the first predetermined wavelength region, and the second light element comprising a second LED that emits light in the second predetermined wavelength region different from the first predetermined wavelength region.

10. The display device according to claim 8, the light source comprising a light guide plate that comprises:

a first light guide region where light in the first predetermined wavelength region is incident from the first light element and emitted to a reflective polarizer side;

a second light guide region where light in the second predetermined wavelength region is incident from the second light element and emitted to the reflective polarizer side; and a light shield provided between the first light guide region and the second light guide region.

11. A display device, comprising:

a liquid crystal panel having liquid crystal sandwiched between a pair of substrates;

a polarizer disposed on one side of the liquid crystal panel;

a reflective polarizer disposed on a side opposite to the polarizer with respect to the liquid crystal panel;

a light source disposed on a side opposite to the liquid crystal panel with respect to the reflective polarizer, and a light absorber provided between the reflective polarizer and the light source, that substantially absorbs external light from a reflective polarizer side and transmitting light from the light source.

12. The display device according to claim 11, the light absorber having an opening.

13. The display device according to claim 11, the light absorber being translucent.

14. The display device according to claim 11, the light absorber being a light scattering member.

15. The display device according to claim 11, the light absorber comprising a polarizer having a transmission axis shifted from that of the reflective polarizer.

16. A display device, comprising:

a liquid crystal panel comprising liquid crystal and a pair of substrates provided with the liquid crystal therebetween, the liquid crystal panel changing a polarization transmission polarization axis;

a polarizer disposed on one side of the liquid crystal panel;

a reflective polarizer disposed on a side opposite to the polarizer with respect to the liquid crystal panel;

a light absorber that substantially absorbs external light; and a light source, disposed on a side opposite to the liquid crystal panel with respect to the reflective polarizer.

17. The display device according to claim 16, the reflective polarizer transmitting a linearly polarized light component in the third predetermined direction for light over substantially the entire wavelength range of the visible light spectrum, and reflecting a linearly polarized light component in the fourth predetermined direction for light over substantially the entire wavelength range of the visible light spectrum.

18. The display device according to claim 16, the reflective polarizer comprising multilayer films laminated in a plurality of layers, and refractive indexes of adjacent layers in the plurality of layers being the same in the third predetermined direction and different in the fourth predetermined direction.

19. The display device according to claim 16, a surface color of the light source being darkened.

20. The display device according to claim 16, the light absorber being an optical element provided between the reflective polarizer and the light source that absorbs light from a reflective polarizer side, and transmits light from the light source to the reflective polarizer side.

21. The display device according to claim 20, optical element absorbs light over substantially the entire wavelength range of the visible light spectrum.

22. The display device according to claim 21, the optical element comprising a black light absorber.

23. The display device according to claim 20, the optical element having an opening.

24. The display device according to claim 23, an area ratio of the opening to the optical element being limited.

25. The display device according to claim 23, a distance between the optical element and the light source being larger than a diameter of the opening.

26. The display device according to the optical element comprising a light absorber in a gray translucent state.

27. The display device according to the light absorber in the translucent state having a transmittance of 10 to 80% for light over substantially the entire visible wavelength spectrum.

28. The display device according to claim 20, the optical element comprising a light scattering member that changes a state of polarization of light incident on the optical element and emitted from the optical element.

29. The display device according to claim 20, the optical element comprising a polarizer having a transmission axis shifted from that of the reflective polarizer.

30. The display device according to claim 20, further comprising a light converging device that converges light from the light source toward a front of the optical element.

31. The display device according to claim 30, the light converging device being disposed between the light source and the reflective polarizer.

32. The display device according to claim 16, further comprising a light diffuser between the liquid crystal panel and the reflective polarizer.

33. The display device according to claim 16, the light source comprising at least one LED that emits light in a predetermined wavelength region to a reflective polarizer side.

34. The display device according to claim 33, the light source comprising:
   a light guide plate that emits light in the predetermined wavelength region, which is incident from the LED, to the reflective polarizer side.

35. An electronic apparatus, comprising the display device according to claim 16 as a display unit.

36. The display device according to claim 16, the light source comprising an EL element that emits light in a predetermined wavelength region to a reflective polarizer side.

37. A display device, comprising:
   a liquid crystal panel comprising a liquid crystal and a pair of substrates provided with the liquid crystal therebetween, the liquid crystal panel;
   a polarizer disposed on one side of the liquid crystal panel;
   a reflective polarizer disposed on a side opposite to the polarizer with respect to the liquid crystal panel;
   a light absorber that substantially absorbs external light; and
   a light source, disposed on a side opposite to the liquid crystal panel with respect to the reflective polarizer, that emits colored light,
   the liquid crystal panel comprising one of a TN liquid crystal element, an STN liquid crystal element, an F-STN liquid crystal element and an ECB liquid crystal element.

38. The display device according to claim 37, further comprising an optical element provided between the reflective polarizer and the light source that absorbs light from a reflective polarizer side, and transmits light from the light source to the reflective polarizer side.

39. The display device according to claim 38, the optical element absorbs light over substantially the entire wavelength range of the visible light spectrum.

40. The display device according to claim 39, the optical element comprising a black light absorber.

41. The display device according to claim 38, the optical element having an opening.

42. The display device according to claim 41, an area ratio of the opening to the optical element being limited.

43. The display device according to claim 41, a distance between the optical element and the light source being larger than a diameter of the opening.

44. The display device according to claim 38, the optical element comprising a light absorber in a gray translucent state.

45. The display device according to claim 44, the light absorber in the translucent state having a transmittance of 10 to 80% for light over substantially the entire visible wavelength spectrum.

46. The display device according to claim 38, the optical element comprising a light scattering member that changes a state of polarization of light incident on the optical element and emitted from the optical element.

47. The display device according to claim 38, the optical element comprising a polarizer having a transmission axis shifted from that of the reflective polarizer.

48. The display device according to claim 38, further comprising a light converging device that converges light from the light source toward a front of the optical element.

49. The display device according to claim 48, the light converging device being disposed between the light source and the reflective polarizer.

50. The display device according to claim 37, further comprising a light diffuser between the liquid crystal panel and the reflective polarizer.

51. The display device according to claim 37, the light source comprising at least one LED that emits light in a predetermined wavelength region to a reflective polarizer side.

* * * * *